(12) United States Patent
Honda

(10) Patent No.: US 10,142,499 B2
(45) Date of Patent: Nov. 27, 2018

(54) DOCUMENT DISTRIBUTION SYSTEM, DOCUMENT DISTRIBUTION APPARATUS, INFORMATION PROCESSING METHOD, AND STORAGE MEDIUM

(71) Applicant: CANON KABUSHIKI KAISHA, Tokyo (JP)

(72) Inventor: Kinya Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/285,417

(22) Filed: Oct. 4, 2016

(65) Prior Publication Data
US 2017/0099403 A1 Apr. 6, 2017

(30) Foreign Application Priority Data

Oct. 6, 2015 (JP) ................. 2015-198684
Oct. 6, 2015 (JP) ................. 2015-198685

(51) Int. Cl.
| G06K 15/02 | (2006.01) |
| H04N 1/00 | (2006.01) |
| G06K 9/00 | (2006.01) |
| H04N 1/21 | (2006.01) |
| G06K 9/20 | (2006.01) |

(52) U.S. Cl.
CPC ..... *H04N 1/00469* (2013.01); *G06K 9/00449* (2013.01); *G06K 9/00463* (2013.01); *G06K 9/00483* (2013.01); *G06K 9/2081* (2013.01); *H04N 1/00413* (2013.01); *H04N 1/2166* (2013.01); *H04N 2201/0094* (2013.01)

(58) Field of Classification Search
CPC ........... H04N 1/00469; H04N 1/00413; H04N 1/2166; H04N 2201/0094; H04N 1/00944; H04N 1/00946; H04N 1/00766; H04N 1/32096; H04N 1/32422; H04N 1/327; H04N 1/32702; H04N 1/32704; H04N 1/32741; H04N 1/32745; H04N 1/32758
See application file for complete search history.

(56) References Cited

U.S. PATENT DOCUMENTS

| 2004/0220898 A1* | 11/2004 | Eguchi | .............. G06F 17/30259 |
| 2011/0221782 A1* | 9/2011 | Ito | ......................... G06F 3/0486 345/671 |

FOREIGN PATENT DOCUMENTS

JP 2011-118513 A 6/2011

* cited by examiner

*Primary Examiner* — Henok A Shiferaw
(74) *Attorney, Agent, or Firm* — Canon USA Inc., IP Division

(57) ABSTRACT

A sample image and a folder name of a selected saving destination folder are obtained, and character recognition processing is performed on the sample image to obtain character strings. When it is determined that the same character string as the folder name of the saving destination folder exists among the obtained character strings, an area where the same character string is detected as an enlargement area, and the identified enlargement area, the sample image, and the folder name are registered while being associated with one another. When a target image on which distribution processing is performed is obtained, a sample image similar to the obtained target image is identified, and an enlargement area registered while being associated with the identified sample image is identified. An area of the target image corresponding to the enlargement area identified by the identification unit is enlarged and displayed on a folder specification screen.

16 Claims, 21 Drawing Sheets

FIG. 3
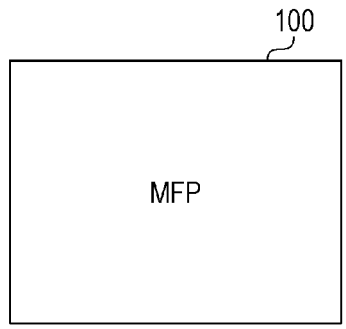
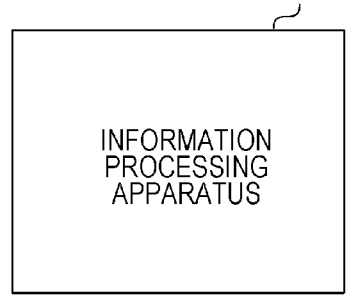
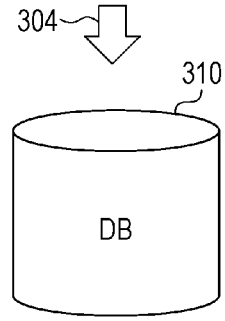

```
<Class =Mitumori>
    <Keyword>
        <Value>ESTIMATE</Value>
        <Area>10,20,120,150</Area>
    </Keyword>
</Class>

<Class =Seikyu>
    <Keyword>
        <Value>BILL</Value>
        <Area>10,20,120,150</Area>
    </Keyword>
</Class>
    :
    :
    :
```

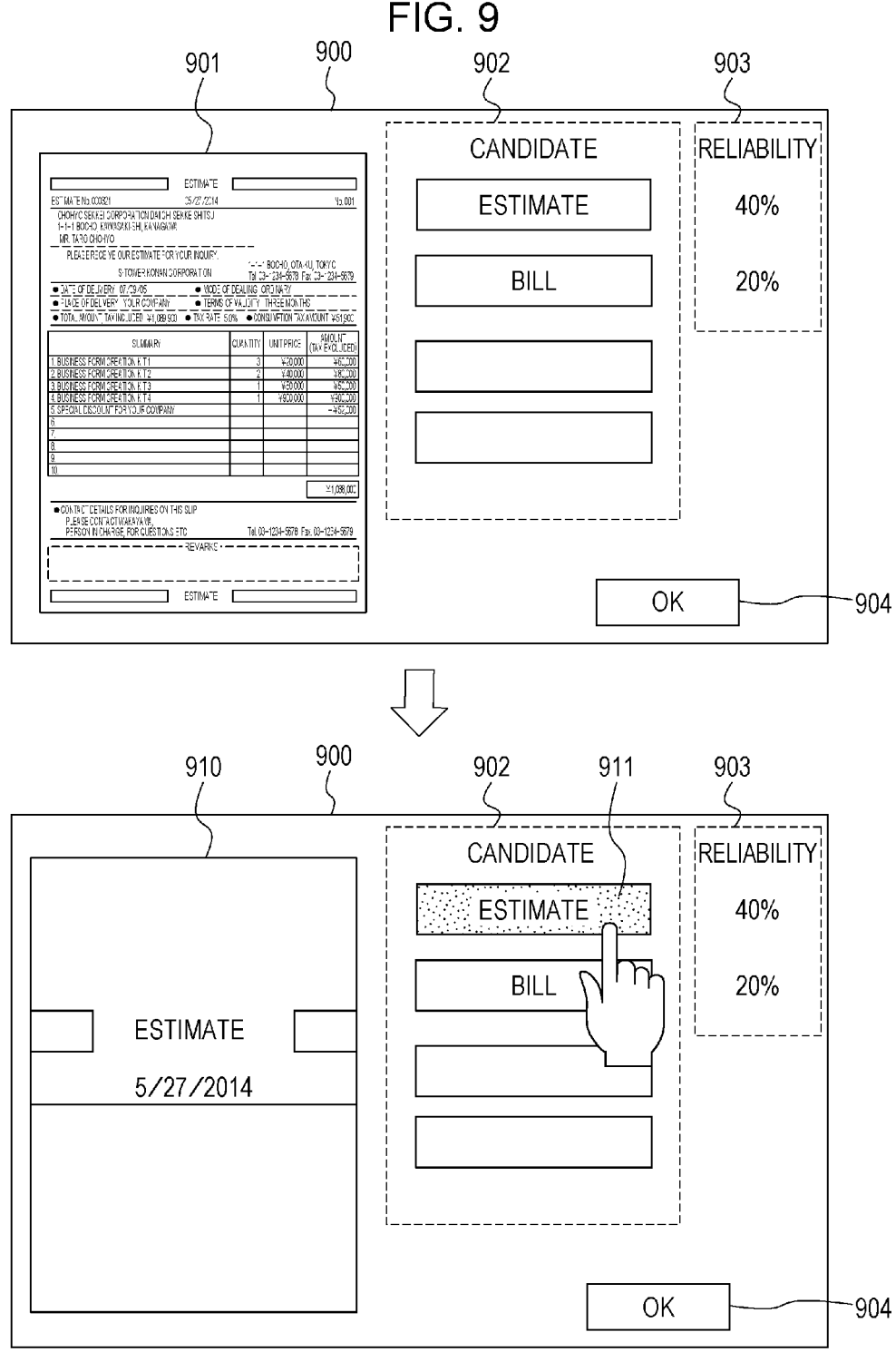

ESTIMATE

ESTIMATE No. 000321  05/27/2014  No. 001

CHOHYO SEKKEI CORPORATION DAIICHI SEKKEISHITSU
1-1-1 BOCHO, KAWASAKI-SHI, KANAGAWA
MR. TARO CHOHYO  1002

PLEASE RECEIVE OUR ESTIMATE FOR YOUR INQUIRY.

S·TOWER KONAN CORPORATION    1-1-1 BOCHO, OTA-KU, TOKYO
                              Tel. 03-1234-5678 Fax. 03-1234-5679

- DATE OF DELIVERY 07/09/05          • MODE OF DEALING ORDINARY
- PLACE OF DELIVERY YOUR COMPANY     • TERMS OF VALIDITY THREE MONTHS
- TOTAL AMOUNT, TAX INCLUDED ¥1,089,900  • TAX RATE 5.0%  • CONSUMPTION TAX AMOUNT ¥51,900

| SUMMARY | QUANTITY | UNIT PRICE | AMOUNT (TAX EXCLUDED) |
|---|---|---|---|
| 1. BUSINESS FORM CREATION KIT 1 | 3 | ¥20,000 | ¥60,000 |
| 2. BUSINESS FORM CREATION KIT 2 | 2 | ¥40,000 | ¥80,000 |
| 3. BUSINESS FORM CREATION KIT 3 | 1 | ¥50,000 | ¥50,000 |
| 4. BUSINESS FORM CREATION KIT 4 | 1 | ¥900,000 | ¥900,000 |
| 5. SPECIAL DISCOUNT FOR YOUR COMPANY | | | -¥52,000 |
| 6. | | | |
| 7. | | | |
| 8. | | | |
| 9. | | | |
| 10. | | | |

¥1,038,000

- CONTACT DETAILS FOR INQUIRIES ON THIS SLIP
  PLEASE CONTACT WAKAYAMA,
  PERSON IN CHARGE, FOR QUESTIONS ETC.    Tel. 03-1234-5678 Fax. 03-1234-5679

REMARKS

ESTIMATE

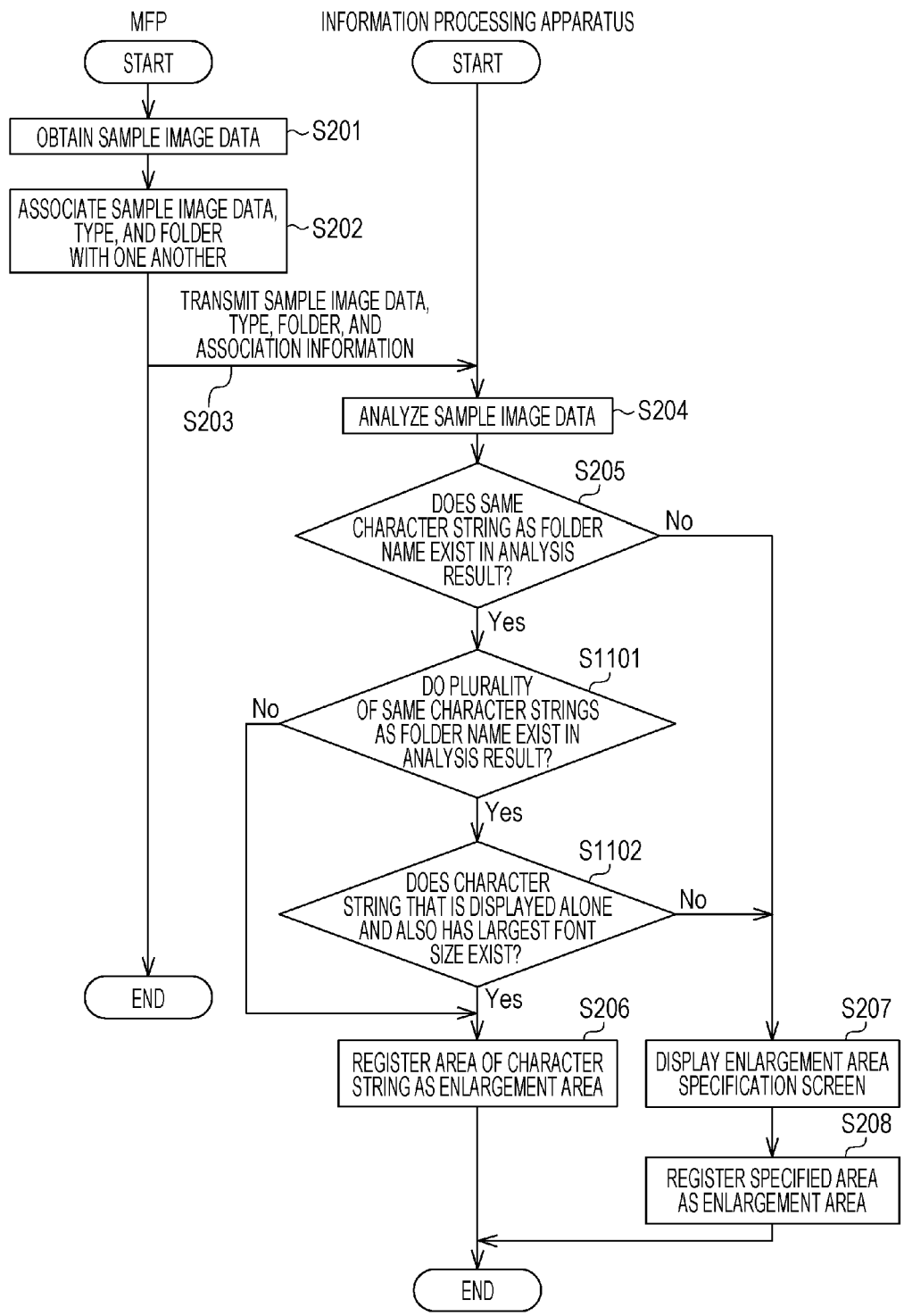

FIG. 21

| CANDIDATE | RELIABILITY |
|---|---|
| BILL | 40% |
| CONTRACT | 20% |
| RECEIPT | 20% |
| CONSENT | 20% |
| ESTIMATE | 20% |

OK

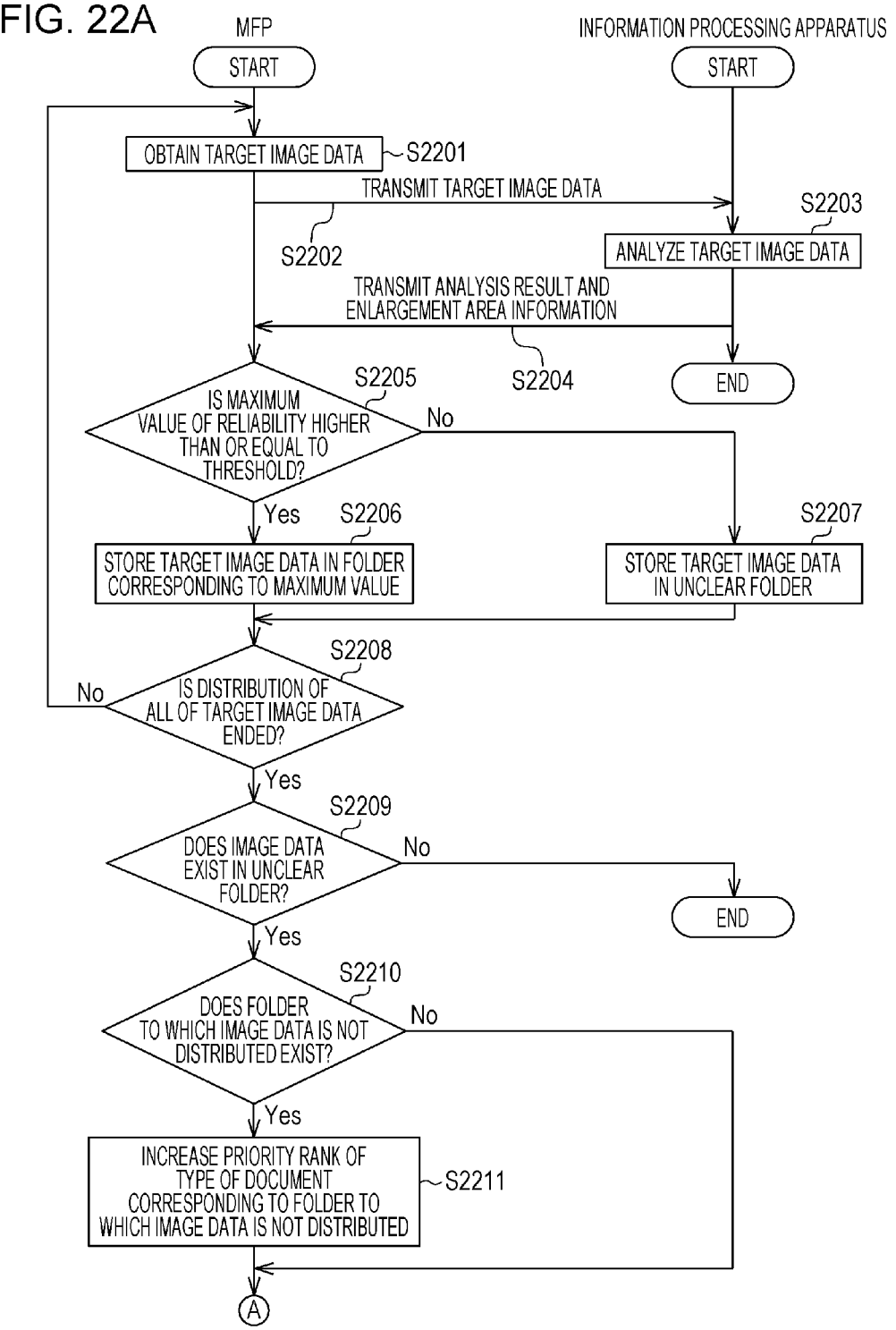

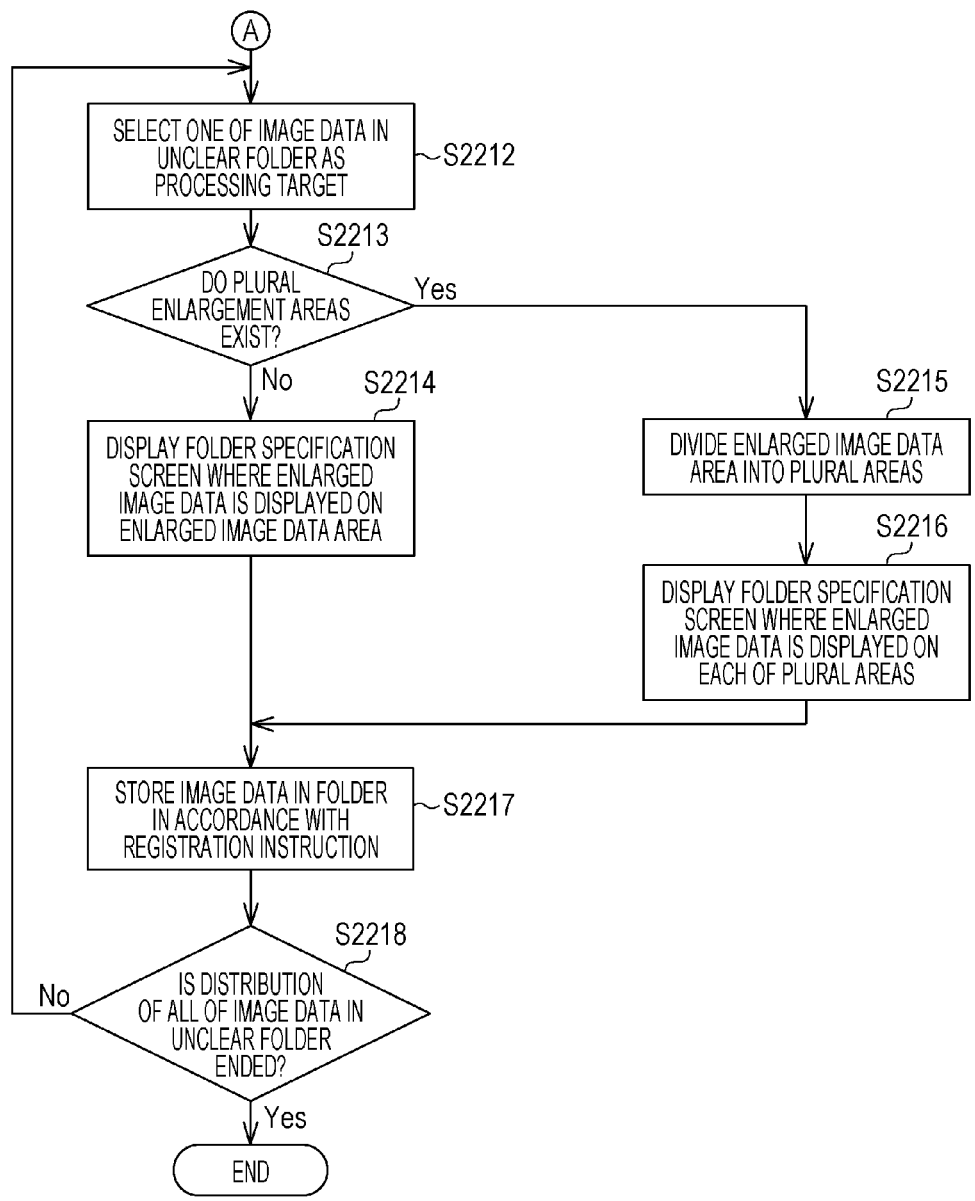

DOCUMENT DISTRIBUTION SYSTEM, DOCUMENT DISTRIBUTION APPARATUS, INFORMATION PROCESSING METHOD, AND STORAGE MEDIUM

BACKGROUND OF THE INVENTION

Field of the Invention

The present invention relates to a document distribution system, a document distribution apparatus, an information processing method, and a storage medium.

Description of the Related Art

Up to now, a document distribution system has been proposed in which a printed product such as a business form is captured as a scanned image, and the scanned image is analyzed by a program to identify a type of the scanned image, so that distribution of the scanned images is performed in accordance with the types. The document distribution system may be constructed in some cases by using a multifunctional peripheral (hereinafter, referred to as an MFP) in which functions of a copier, a printer, an image scanner, a facsimile, and the like are integrated with one another. For example, the MFP scans a document and analyzes the document by a program to identify a type of the document (for example, a type of the business form such as an estimate, a bill, or a contract), and saves the scanned image in a folder previously set for each of the identified types.

In the document distribution system, a type of the document, a sample image for each type of the documents (or feature information indicating a format of the business form), and a saving destination folder of the document are previously associated with one another in accordance with user operations. Subsequently, the document distribution system identifies with which sample image the scanned image is matched, so that the type of the document corresponding to the scanned image is identified. Then, the document distribution system distributes the scanned image to the folder in accordance with the type of the document. With regard to this technology, Japanese Patent Laid-Open No. 2011-118513 describes a technology for performing display while a difference between a sample image and an image of a classification target is emphasized.

According to an image classification technology, a case also occurs that a scanned image is not accurately classified. In this case, the user checks the scanned image and identifies a folder of a classification destination. At this time, in a case where a display screen of the scanned image is small, the user performs an operation for enlarging and displaying the scanned image and checks the displayed scanned image while being enlarged. In addition, a technology has been also proposed in which the user previously registers a position of an enlargement area on the basis of a layout of a sample image. Accordingly, in a case where the user specifies the type of the scanned image, the document distribution system can identify the sample image corresponding to the specified type and enlarge and display the scanned image on the basis of the previously registered position of the enlargement area with respect to the sample image. However, it takes much work for the user to specify enlargement areas with respect to documents of all types.

SUMMARY OF THE INVENTION

A document distribution system according to an aspect of the present invention includes a first obtaining unit configured to obtain a sample image and a folder name of a saving destination folder selected by a user, an analysis unit configured to execute character recognition processing on the sample image to obtain character strings, a determination unit configured to determine whether or not the same character string as the folder name of the saving destination folder exists among the character strings obtained by the analysis unit, a registration unit configured to identify an area where the same character string is detected as an enlargement area in a case where the determination unit determines that the same character string as the folder name of the saving destination folder exists and register the identified enlargement area, the sample image, and the folder name while being associated with one another, a second obtaining unit configured to obtain a target image on which distribution processing is performed, and an identification unit configured to identify a sample image similar to the target image obtained by the second obtaining unit and identify an enlargement area registered while being associated with the identified sample image.

In addition, a document distribution apparatus according to another aspect of the present invention includes an obtaining unit configured to obtain an image, and a display control unit configured to perform control in a manner that the image is enlarged and displayed on a basis of an enlargement area corresponding to a currently selected folder on a folder specification screen for specifying a folder serving as a saving destination of the image, in which, in a case where a plurality of enlargement areas are associated with the folder, the display control unit performs the control in a manner that the plurality of enlargement areas of the image are lined up to be enlarged and displayed.

Further features of the present invention will become apparent from the following description of exemplary embodiments with reference to the attached drawings.

BRIEF DESCRIPTION OF THE DRAWINGS

FIG. 3 is an explanatory diagram for describing the sample image data registration processing.

FIG. 9 illustrates a display example of a folder specification screen.

FIG. 10 illustrates an example of target image data.

FIG. 11 is a flow chart illustrating the sample image data registration processing according to a second exemplary embodiment.

FIG. 21 illustrates an example of the folder specification screen.

FIG. 22A is a sequence diagram illustrating the target image data distribution processing.

FIG. 22B is a sequence diagram illustrating the target image data distribution processing.

DESCRIPTION OF THE EMBODIMENTS

First Exemplary Embodiment

Figure 1:
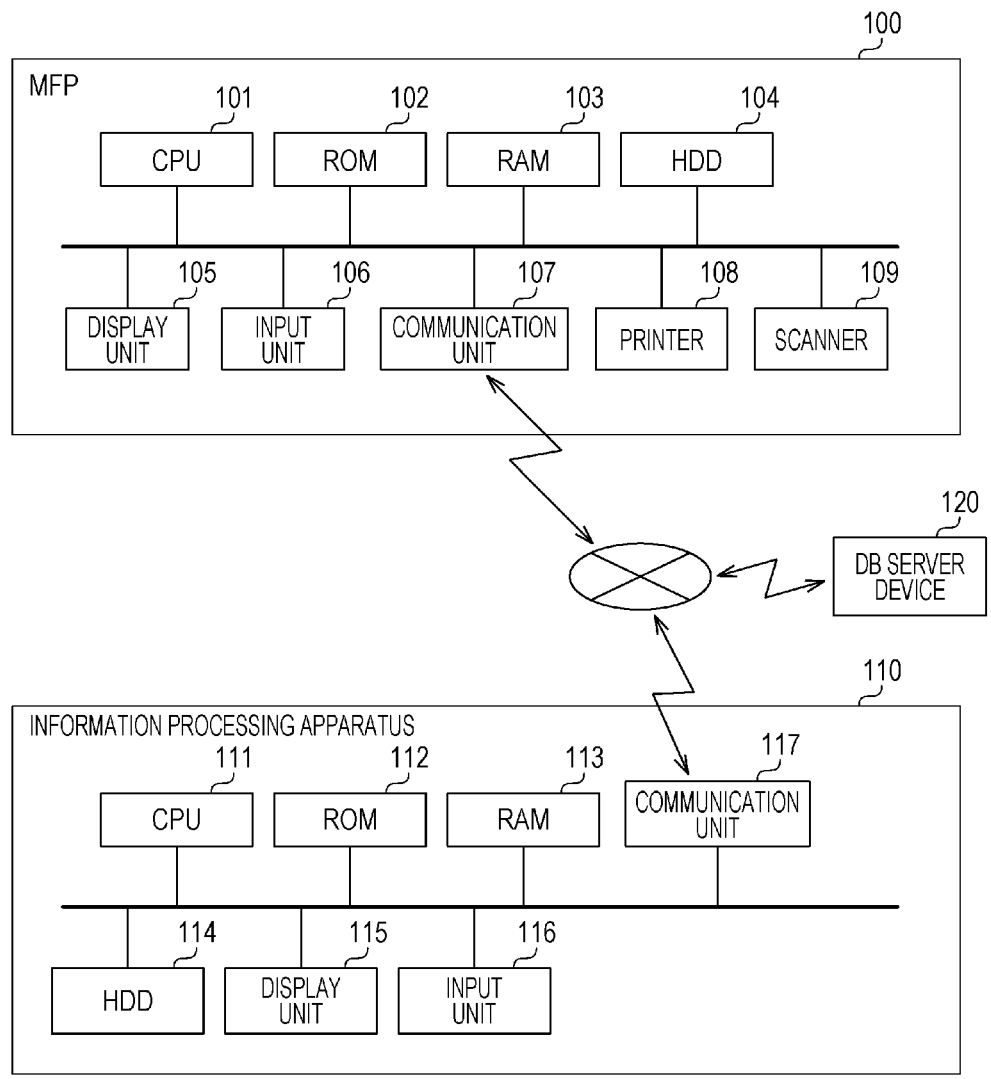
FIG. 1 illustrates a document distribution system.

FIG. 1 illustrates a document distribution system according to a first exemplary embodiment. The document distribution system according to the present exemplary embodiment analyzes image data obtained by scanning a document to identify a type of the corresponding document and stores the image data in a folder previously set in accordance with the type of the document. Herein, the folder is an example of a group. The document distribution system includes a multifunction peripheral (MFP) 100, an information processing apparatus 110, and a database (DB) server device 120.

The MFP 100 includes a CPU 101, a ROM 102, a RAM 103, an HDD 104, a display unit 105, an input unit 106, a communication unit 107, a printer 108, and a scanner 109. The CPU 101 reads out a control program stored in the ROM 102 and executes various processings. The RAM 103 is used as a temporary storage area such as a main memory of the CPU 101 or a work area. The HDD 104 stores various information such as the image data and various programs. The display unit 105 displays the various information. The input unit 106 includes a keyboard or a mouse and accepts various operations performed by the user. The communication unit 107 performs communication processing with an external apparatus such as the information processing apparatus 110 or the DB server device 120 via a network. It should be noted that a function and processing of the MFP 100 which will be described below are realized while the CPU 101 reads out the program stored in the ROM 102 or the HDD 104 and executes this program.

The information processing apparatus 110 includes a CPU 111, a ROM 112, a RAM 113, an HDD 114, a display unit 115, an input unit 116, and a communication unit 117. Processings of the CPU 111, the ROM 112, the RAM 113, the HDD 114, the display unit 115, the input unit 116, and the communication unit 117 are respectively similar to the processings of the CPU 101, the ROM 102, the RAM 103, the HDD 104, the display unit 105, the input unit 106, and the communication unit 107. In addition, a function and processing of the information processing apparatus 110 which will be described below are realized while the CPU 111 reads out a program stored in the ROM 112 or the HDD 114 and executes this program.

Figure 2:
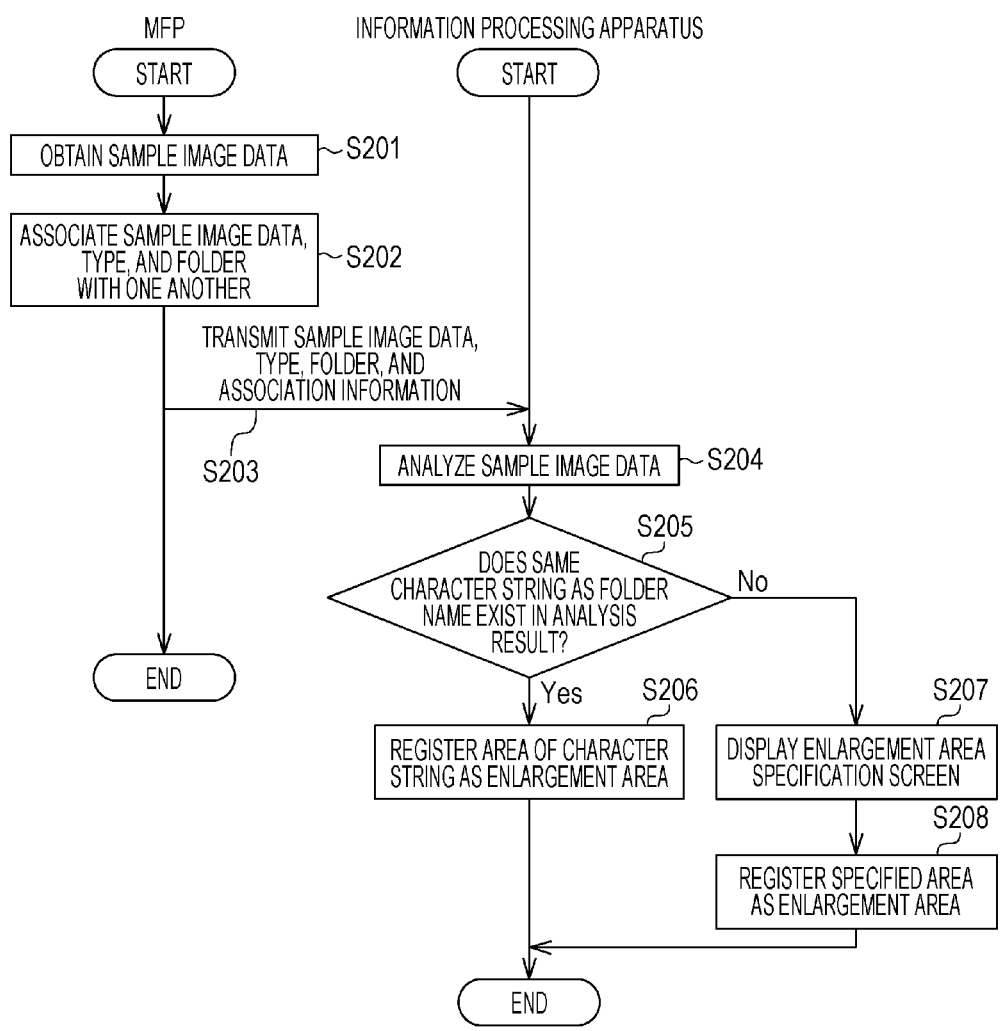
FIG. 2 is a flow chart illustrating sample image data registration processing.

FIG. 2 is a flow chart illustrating sample image data registration processing by the document distribution system. FIG. 3 is an explanatory diagram for describing the sample image data registration processing. Herein, sample image data refers to image data obtained by scanning a sample document (template document) prepared for each type of the documents (for example, a type of the business form such as an estimate, a bill, or a contract) by the MFP 100. It should be noted that the sample document may be either a business form document in which variable data (for example, an entry content such as an ordering person or an order content) has been already written or a business form document in which variable data has not been written. In addition, according to the present exemplary embodiment, it is possible to associate and specify to which folder each type of the documents is distributed.

First, the user sets a sample document 300 on the scanner 109 of the MFP 100 (which is denoted by reference symbol 301 of FIG. 3) and instructs to scan this document. Then, in S201 of FIG. 2, the CPU 101 of the MFP 100 obtains sample image data.

Figure 4:
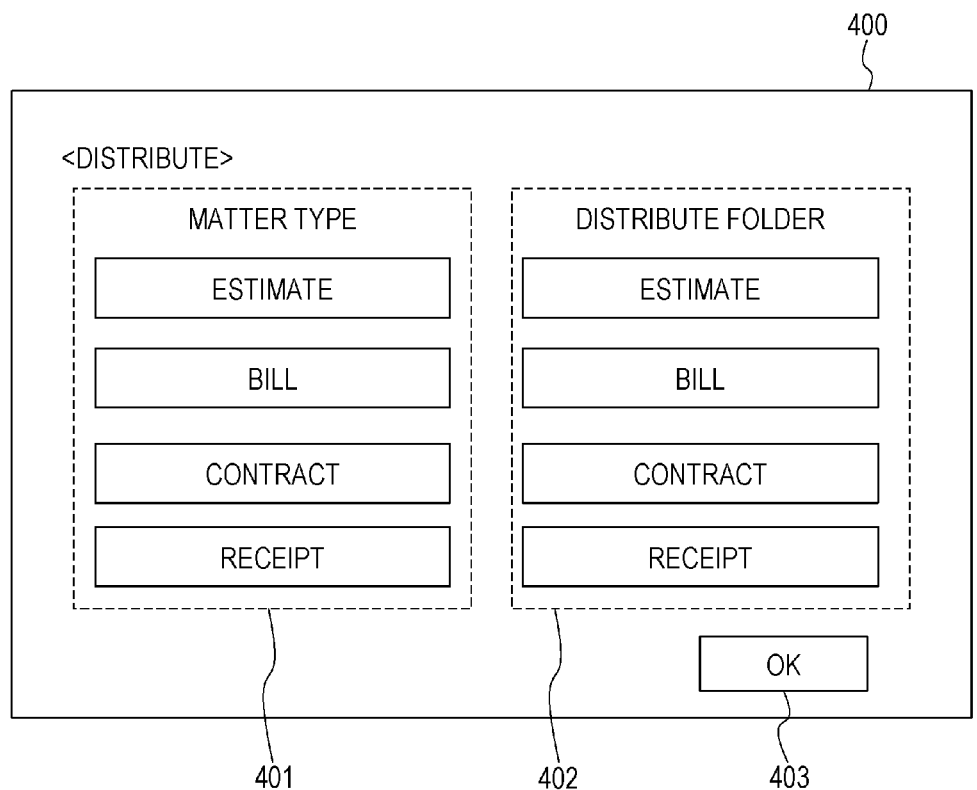
FIG. 4 illustrates a display example of a sample image registration screen.

Next, in S202, the CPU 101 performs control (which is denoted by reference symbol 302 of FIG. 3) so as to display a sample image registration screen (which is denoted by reference symbol 400 of FIG. 4). Thereafter, the CPU 101 associates the sample image data, the type of the document corresponding to the sample image data, and the folder (group) with one another on the basis of the instruction on the screen. A matter type (document type) area 401, a distribute (folder name) area 402, and OK button 403 are displayed on the screen 400. A plurality of type buttons indicating types of documents are displayed on the matter type area 401. A plurality of folder name buttons indicating folder names (group names) of folders for saving the image data corresponding to the documents are displayed on the distribute area 402. The user selects one each of the types of the sample documents corresponding to the scanning targets and the folder names of the saving destination folders on the screen 400 and presses the OK button 403. In contrast to this, the CPU 101 associates the selected type with the folder name. Furthermore, the CPU 101 associates the sample image data with the selected type. Next, in S203, the sample image data, the selected type, the selected folder, and association information indicating that these items are associated with one another are transmitted to the information processing apparatus 110 (which is denoted by reference symbol 303 of FIG. 3).

In S203, when the CPU 111 of the information processing apparatus 110 receives the sample image data, the type of the document, and the folder name of the saving destination folder, an image analysis of the sample image data is performed in S204. Specifically, the CPU 111 performs area division processing and character recognition (OCR) processing with respect to the entirety of the sample image data. The area division processing refers to processing of performing an area analysis of the scanned image and dividing the scanned image into an area for each of attributes such a text, a graphic pattern, a table, and a caption.

Next, in S205, the CPU 111 checks whether or not the same character string as the folder name of the saving destination folder associated with the sample image data exists in the result of the character recognition processing obtained in S204. In a case where the same character string exists (S205: Yes), the CPU 111 advances the processing to S206. In a case where the same character string does not exist (S205: No), the CPU 111 advances the processing to S207. It should be noted that the processing in S205 is an example of detection processing of detecting a character string corresponding to the folder name. It should be noted that, according to the present exemplary embodiment, the same character string as the folder name is set as the detection target. However, the character string of the detection target may be a character string similar to the folder name or a character string partially matched with the folder name, and the configuration is not limited to the exemplary embodiment. It should be noted that a condition for the CPU 111 to identify the character string corresponding to the folder name is previously set in the HDD 104 or the like. As another example, the CPU 111 may determine that a similar character string is included in a case where a character string including a character string matched with part of the character string in the folder name like a character string "estimation" with respect to the folder name "estimate".

In S206, the CPU 111 identifies an area where the same character string as the folder name is detected as an enlargement area. Subsequently, the CPU 111 associates the type of the document, the folder name, the sample image data, and the enlargement area information indicating the enlargement area with one another and registered in a database (DB) 310 (which is denoted by reference symbol 304 of FIG. 3). Herein, the processing in S206 is an example of registration processing. It should be noted that the DB 310 is a storage unit realized by the HDD 114. In addition, as another example, the CPU 111 may register the type of the document or the like in the DB server device 120 via the communication unit 117 instead of the DB 310.

Figures 5, 6:
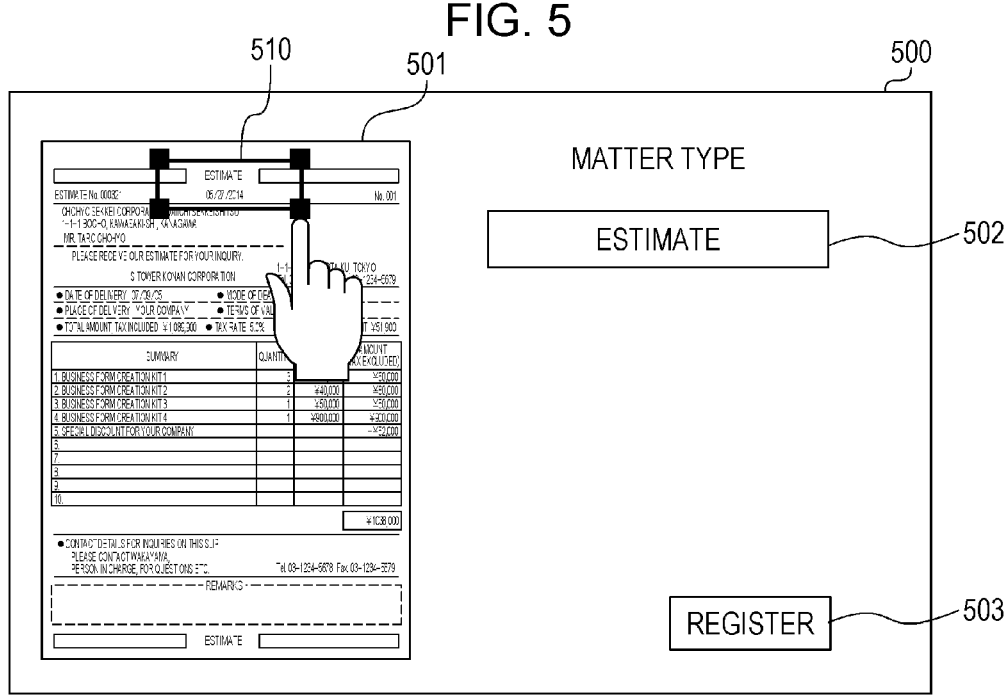
FIG. 5 illustrates a display example of an enlargement area specification screen.
FIG. 6 illustrates an example of information in which a type of a document is associated with enlargement area information.

On the other hand, when it is determined that the same character string does not exist in S205, the CPU 111 does not automatically identify the enlargement area from the result of the character recognition. In view of the above, in S207, the CPU 111 displays an enlargement area specification screen for the user to specify the enlargement area. FIG. 5 illustrates a display example of an enlargement area specification screen 500. Sample image data 501 and a matter type 502 of the document specified by the user from the matter type area 401 of FIG. 4 are displayed on the enlargement area specification screen 500. The sample image data 501 is the sample image data received in S203, and the matter type 502 of the document is the type of the document associated with the sample image data 501. The user specifies the enlargement area 510 on the sample image data 501 via the input unit 116 as illustrated in FIG. 5. Thereafter, when a registration button 503 is pressed by the user, the CPU 111 accepts the enlargement area 510 specified by the user as the enlargement area (acceptance processing) in S208. Subsequently, the CPU 111 associates the type of the document, the folder name, the sample image data, and the enlargement area information indicating the enlargement area 510 with one another to be registered in the DB 310 (which is denoted by reference symbol 304 of FIG. 3).

FIG. 6 illustrates an example of information 600 in which the type of the document is associated with the enlargement area information. In the example of FIG. 6, the type of the document "estimate" 601 is associated with the enlargement area 602. "10, 20, 120, 150" in the enlargement area 602 of FIG. 6 represents upper left coordinates (10, 20) and lower right coordinates (120, 150) in the area of the character string. It should be noted that, according to the present exemplary embodiment, the enlargement area is set as a rectangle, and the enlargement area information is information indicating coordinates at two upper left and lower right points of the rectangle. It should be noted however that the shape of the enlargement area is not limited to the rectangle. In addition, the information for identifying the enlargement area is not limited to the upper left and lower right coordinates, and other information may also be used.

Figure 7:
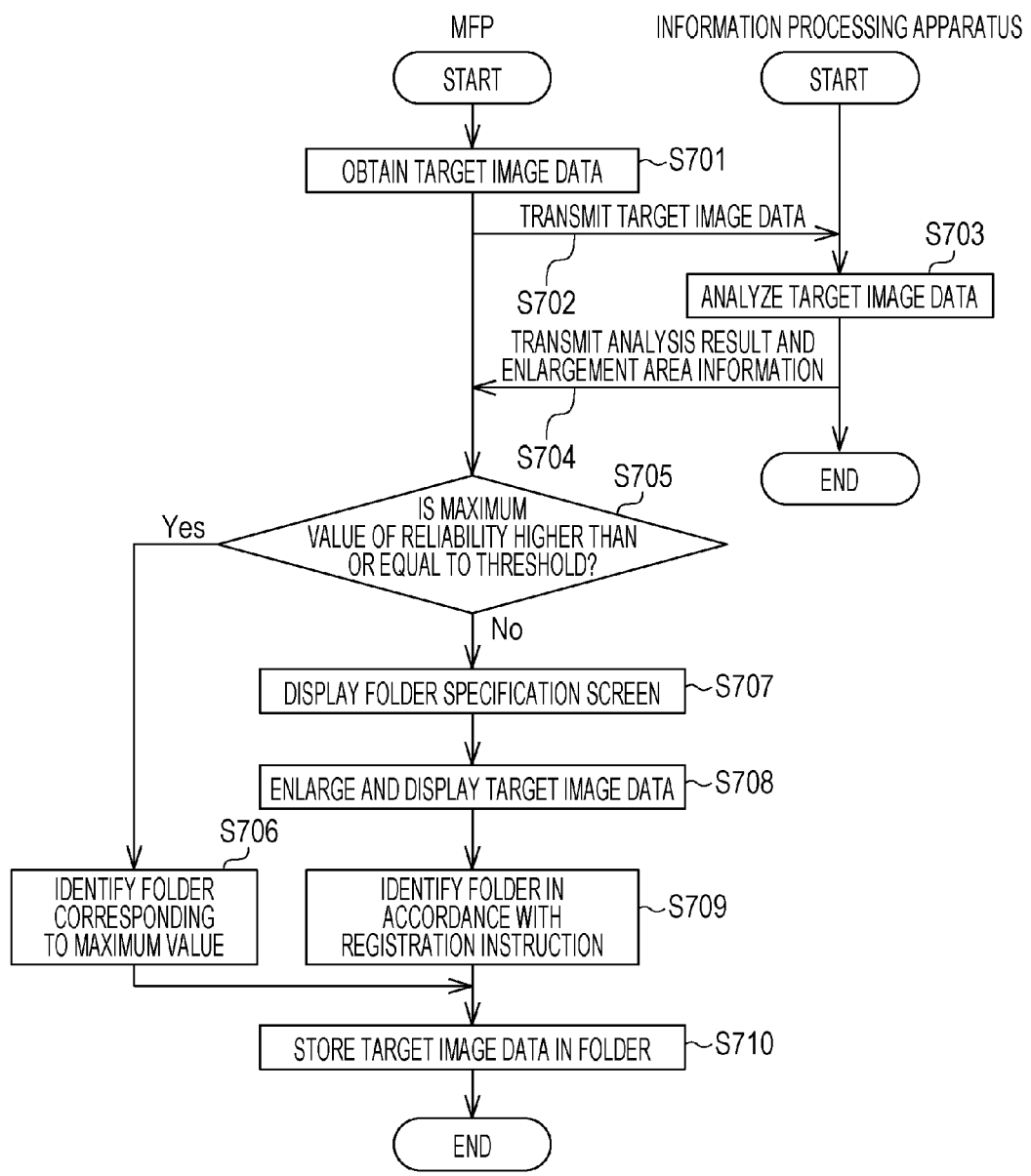
FIG. 7 is a flow chart illustrating target image data distribution processing.
Figure 8:
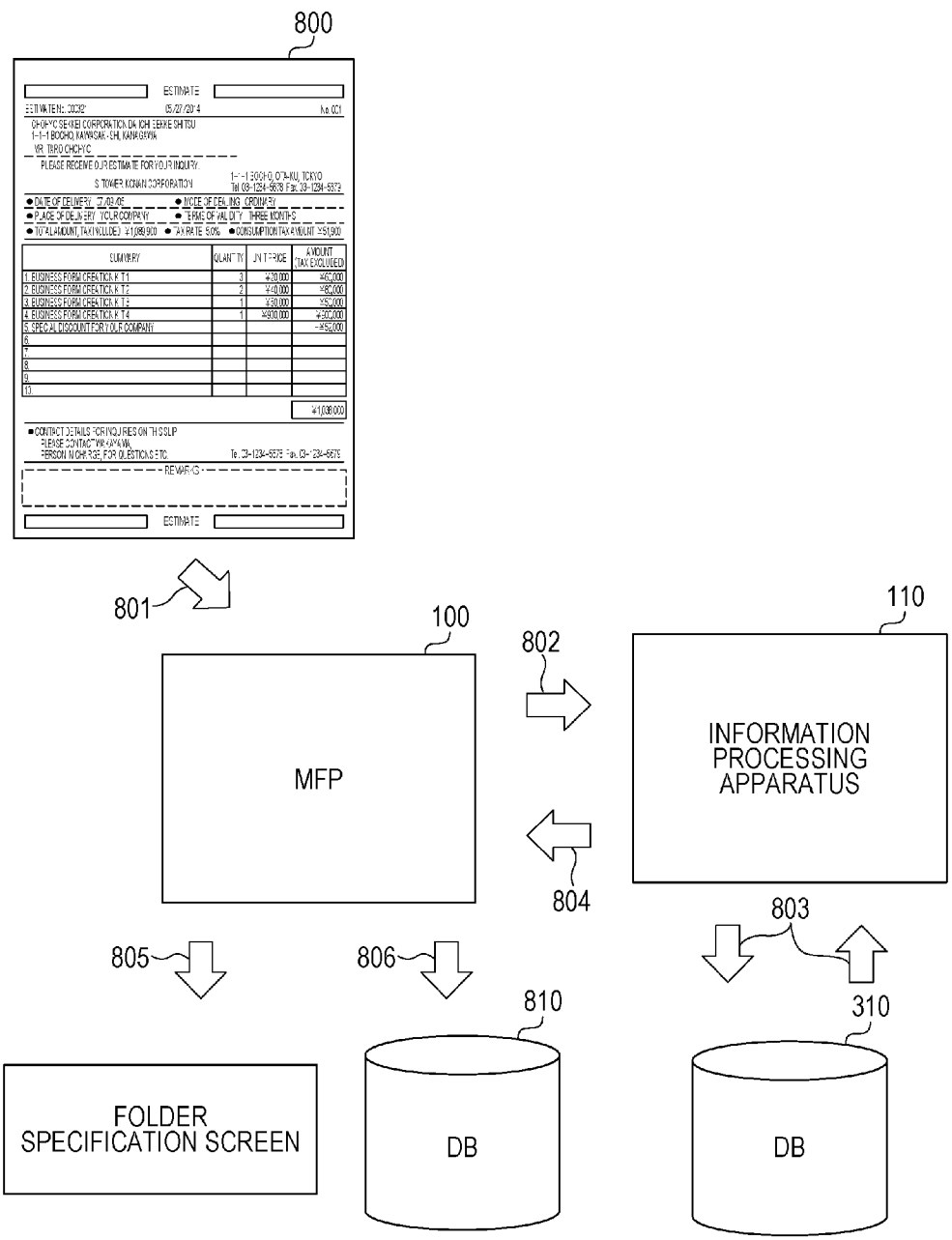
FIG. 8 is an explanatory diagram for describing the target image data distribution processing.

FIG. 7 is a flow chart illustrating target image data distribution processing. FIG. 8 is an explanatory diagram for describing the target image data distribution processing (classification processing of target image data). Herein, the target image data is image data obtained while the MFP 100 scans the document of the distribution processing target (target document).

First, the user sets a target document 800 on the scanner 109 of the MFP (which is denoted by reference symbol 801 of FIG. 8) and instructs to scan the target document 800. Subsequently, in S701 of FIG. 7, the CPU 101 of the MFP 100 obtains target image data as a result of the scanning by the scanner 109. Next, in S702, the CPU 101 transmits the target image data to the information processing apparatus 110 (which is denoted by reference symbol 802 of FIG. 8).

In S702, when the information processing apparatus 110 receives the target image data, the analysis of the target image data is performed in S703. Specifically, the CPU 111 of the information processing apparatus 110 compares the respective sample image data registered in the DB 310 for the respective types of the documents with the target image data received in S702 (which is denoted by reference symbol 803 of FIG. 8). Then, the CPU 111 calculates reliabilities with respect to the respective sample image data (calculation processing) on the basis of the comparison result. The CPU 111 uses, for example, similarities between the target image data and the respective sample image data as the reliabilities. Then, the CPU 111 sequentially identifies a predetermined number of pieces of the sample image data in a descending order from the higher reliabilities (similarities). Furthermore, the CPU 111 identifies the type of the document associated with the identified sample image data and identifies the enlargement area information associated with the type of the document. Next, in S704, the CPU 111 transmits the analysis result and the enlargement area information corresponding to the types of the respective documents to the MFP 100 (which is denoted by reference symbol 804 of FIG. 8). Herein, the analysis result includes the type of the document identified in S703 and the reliabilities for the respective types of the documents.

In S704, when the MFP 100 receives the analysis result and the enlargement area information, in S705, the CPU 101 of the MFP 100 compares a maximum value of the reliability as the received analysis result with a predetermined threshold. Herein, the threshold is previously set in the HDD 104 or the like. In a case where the maximum value of the reliability is higher than or equal to the threshold (S705: Yes), the CPU 101 advances the processing to S706. It should be noted that the case where the maximum value is higher than or equal to the threshold is a case where the type of the document corresponding to the sample image data indicating the maximum value can be identified as the type of the document corresponding to the target image data. In view of the above, in this case, in S706, the CPU 101 identifies the folder associated with the type of the document corresponding to the sample image data indicating the maximum value as a distribution destination folder of the target image data and advances the processing to S710.

On the other hand, in S705, in a case where the maximum value is lower than the threshold (S705: No), the CPU 101 advances the processing to S707. It should be noted that the case where the maximum value is lower than the threshold is a case where the CPU 101 does not automatically identify the type of the document corresponding to the target image data. In view of the above, in this case, processing is performed such that folders of distribution destination candidates are displayed, and the user is asked to specify the distribution destination folder. That is, in S707, the CPU 101 displays a folder specification screen (which is denoted by reference symbol 805 of FIG. 8). FIG. 9 illustrates a display example of a folder specification screen 900. The folder specification screen 900 displays target image data 901, an area 902 for displaying document types (distribution destination candidates), and an area 903 for displaying reliabilities of the respective candidates. Folder name buttons indicating the candidates of the document type and reliabilities calculated with respect to the respective candidates are associated with each other to be displayed on the area 902 and the area 903.

Herein, when the user selects one of the folder name buttons illustrated in the area 902, in S708, the CPU 101 performs control such that the display unit 105 enlarges and displays the enlargement area of the target image data 901 (display control processing) in the area included in the target image data 901 on the basis of the enlargement area information associated with the folder name (the type of the document) corresponding to the selected folder name button. For example, as illustrated in FIG. 9, when the user selects a folder name button 911 "estimate", the CPU 101 displays part of the target image data 901 as enlarged image data 910 on the basis of the enlargement area information registered while being associated with this "estimate". Herein, the enlarged image data 910 is an image in which the enlargement area is enlarged and displayed among the target image data 901. According to the present exemplary embodiment, the target image data 901 in which the enlargement area is cut out so as to be located at the center of the enlarged image data 910 is displayed on the enlarged image data 910.

It should be noted that, in a case where the user selects an incorrect folder name button, the enlarged image data corresponding to this folder name button is displayed, but the area that is not intended by the user is enlarged and displayed in this case. For this reason, when the user views the enlarged image data, the user can understand that the selected folder name is incorrect and select another folder name button again.

The user checks the enlarged image data 910 to confirm whether or not the distribution destination of the target image data is the folder corresponding to the currently selected folder name button. Then, the user confirms that the distribution is the folder corresponding to the currently selected folder name button and presses an OK button 904. When the OK button 904 is pressed, in S709, the CPU 101 identifies the folder corresponding to the currently selected folder name button as the distribution destination folder and advances the processing to S710.

In S710, the CPU 101 stores the target image data in the folder identified in S706 or S709 (which is denoted by reference symbol 806 of FIG. 8). It should be noted that the storage destination of the target image data as the folder is a DB 810, and the DB 810 is a storage unit realized by the HDD 104 of the MFP 100. In addition, as another example, the CPU 101 may register the target image data in an external apparatus such as the DB server device 120 via the communication unit 107 instead of the HDD 104 of the MFP 100. Thus, the target data distribution processing is ended.

The folder name of the distribution destination of the target image data specified by the user indicates the type of the document in many cases. For example, the document of the type "estimate" is set to be distributed to the folder having the folder name "estimate" in many cases. In addition, probability that the document of the type "estimate" includes the character string "estimate" in the document is high. In view of these aspects, in the document distribution system according to the present exemplary embodiment, when the sample image data is registered, the same character string as the folder name at the distribution destination is searched for from the OCR result of the sample image data, and the area of this character string is automatically registered as the enlargement area. Accordingly, work of specifying and registering the enlargement area by the user operation can be reduced, and it is possible to alleviate burden of the user.

According to the first exemplary embodiment, the sample image data registration processing and the target image data distribution processing are realized by the MFP 100 and the information processing apparatus 110 in cooperation but may be executed by a single apparatus such as the information processing apparatus 110, for example. It should be noted that the processing of transmitting and receiving the data (S203, S702, S704) is not necessary in this case.

Second Exemplary Embodiment

Next, a difference with regard to the document distribution system according to a second exemplary embodiment from the document distribution system according to the first exemplary embodiment will be described. Like target image data 1000 illustrated in FIG. 10, a plurality of the same character strings as the folder name are included in the target image data 1000 in some cases. The target image data 1000 illustrated in FIG. 10 includes two character strings 1001 and 1002 "estimate" which are the same as the folder name. With regard to the document distribution system according to the second exemplary embodiment, in a case where a plurality of the same character strings as the folder name are included in the analysis result in the sample image data registration processing, one of these character strings is identified, and the area of the identified character string is registered as the enlargement area.

FIG. 11 is a flow chart illustrating the sample image data registration processing by the MFP 100 according to the second exemplary embodiment. In FIG. 11, the same processes as the respective processes in the sample image data registration processing illustrated in FIG. 2 are assigned with the same reference numerals. In S205 of FIG. 11, in a case where the same character string as the folder name exists in the analysis result (character recognition result obtained in S204) (S205: Yes), the CPU 111 advances the processing to S1101. In S1101, the CPU 111 checks whether or not a plurality of the same character strings as the folder name exist in the analysis result. In a case where the plurality of the same character string sexist (S1101: Yes), the CPU 111 advances the processing to S1102. In a case where the single same character string exists (S1101: No), the CPU 111 advances the processing to S206. Then, in S206, the CPU 111 registers the area of the single character string as the enlargement area.

In S1102, the CPU 111 checks whether or not a character string that is displayed alone and also has a largest font size in the document exists among the plurality of character strings determined as the same as the folder name. Herein, a state in which the character string is displayed alone is not a state in which, for example, the character string is combined with other character strings like a character string in a sentence but means that the character string alone like a headline is displayed. In a case where the character string that is displayed alone and also has the largest font size exists (S1102: Yes), the CPU 111 advances the processing to S206. In this case, in S206, the CPU 111 identifies the character string that is displayed alone and also has the largest font size and registers the area of the identified character string as the enlargement area.

In a case where the character string that is displayed alone and also has the largest font size does not exist (S1102: No), the CPU 111 advances the processing to S207. In a case where the processing is advanced to S207, the user is asked to specify the enlargement area. It should be noted that, in S1102, the condition where the CPU 111 identifies a single character string from the plurality of character strings (condition where the single character is written alone like a heading, and also the font size is large) is previously registered in the HDD 104 or the like by an engineer or the like. In addition, the determination condition in S1102 is an example, and the configuration is not limited to the exemplary embodiment. For example, the area of the character string having the largest size among the plurality of the same character strings as the folder name may be identified, and the area of the character string having the largest size may be registered as the enlargement area in S206. In addition, as another example, the CPU 111 may identify an area of a character string having a different type of the font from that of the other character strings or a bold character string among the plurality of the same character strings as the folder name to be registered as the enlargement area. Herein, the processing in S1102 is an example of identification processing of identifying a single character string in accordance with a previously set condition. It should be noted that the other configuration and processing of the document distribution system according to the second exemplary embodiment are similar to the configuration and processing of the document distribution system according to the first exemplary embodiment.

Thus, according to the above-described respective exemplary embodiments, it is possible to alleviate burden of the user at the time of the image data registration.

Third Exemplary Embodiment

Next, a difference with regard to the document distribution system according to a third exemplary embodiment from the document distribution system according to the first exemplary embodiment will be described.

Figure 12:
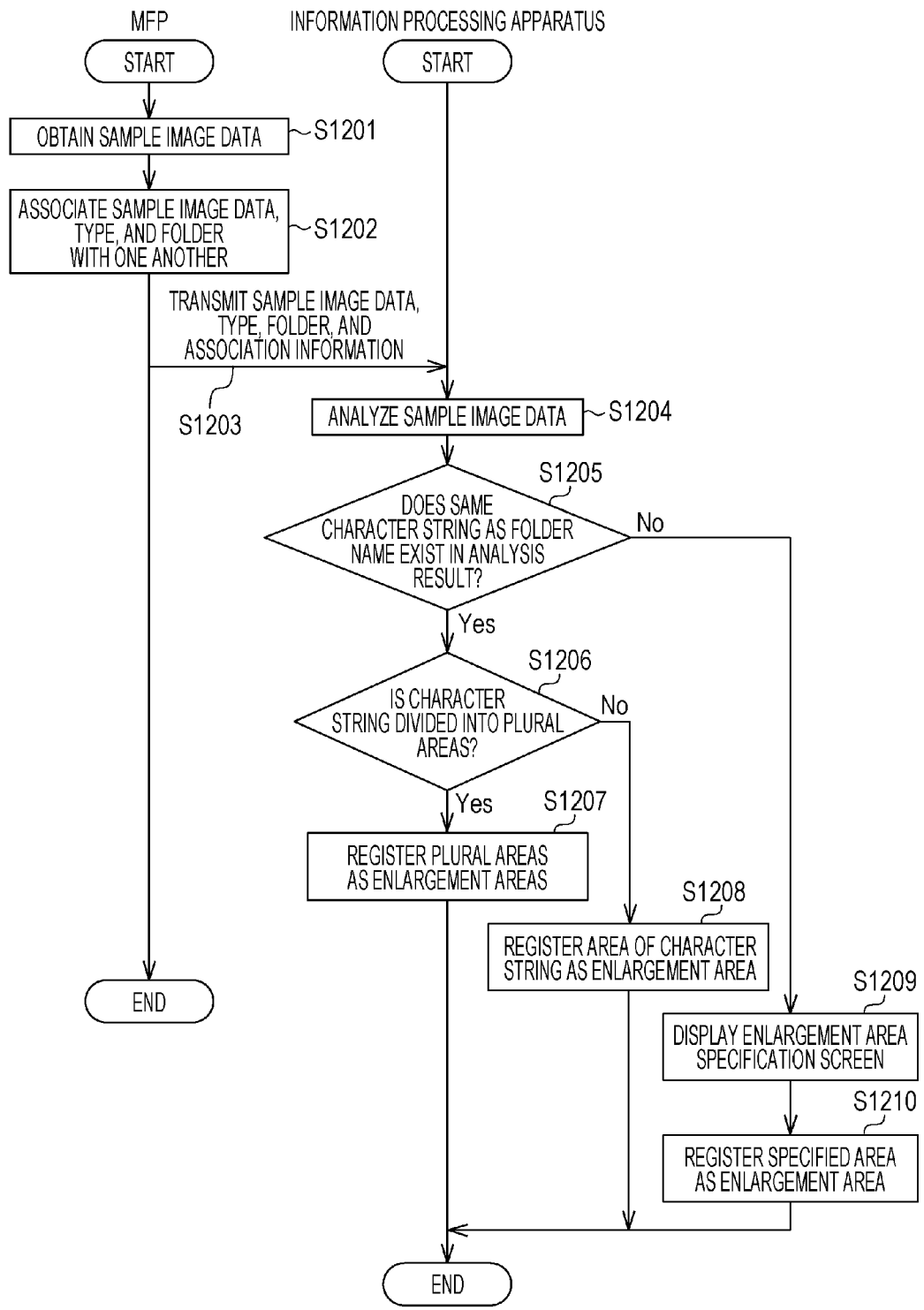
FIG. 12 is a sequence diagram illustrating the sample image data registration processing.

FIG. 12 is a sequence diagram illustrating the sample image data registration processing in the document distribution system according to the third exemplary embodiment. In S1201 of FIG. 12, the processing for the CPU 101 to obtain the sample image data is similar to S201 of FIG. 2.

Figure 13:
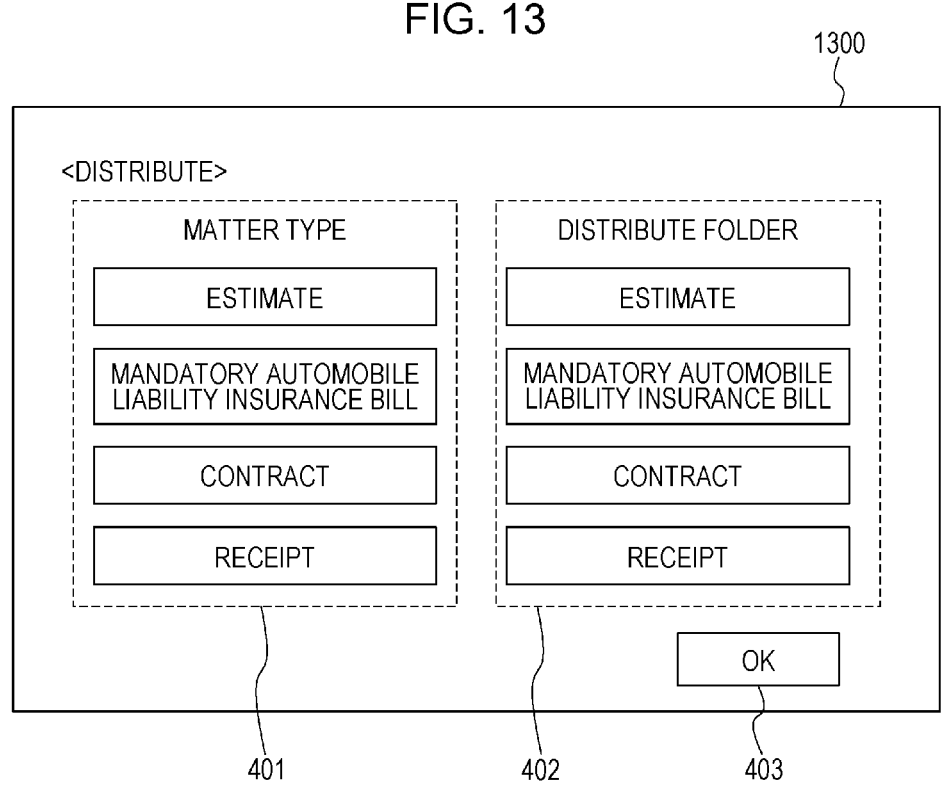
FIG. 13 illustrates an example of the sample image registration screen.

Next, in S1202, the CPU 101 performs control so as to display an enlargement area specification screen (which is denoted by reference symbol 1300 of FIG. 13). Then, the CPU 101 associates the sample image data, the type of the document corresponding to the sample image data, and the folder (group) with one another on the basis of the instruction on the screen. The matter type area 401, the distribute area 402, and the OK button 403 are displayed on a sample image registration screen 1300 of FIG. 13. In FIG. 13, as being different from FIG. 4, a long name "mandatory automobile liability insurance bill" is included as the type of the document and the folder name. Next, in S1203, the sample image data, the type selected from the matter type area 401 of FIG. 13, the folder selected from the distribute area 402, and the association information indicating that these items are associated with one another are transmitted to the information processing apparatus 110.

In S1203, when the sample image data or the like is received, the CPU 111 of the information processing apparatus 110 performs the image analysis of the sample image data in S1204. Specifically, the CPU 111 performs the area division processing and the character recognition (OCR) processing with respect to the entirety of the sample image data. The area division processing refers to processing of performing the area analysis of the scanned image and dividing the scanned image into the area for each of the attributes such as the text, the graphic pattern, the table, and the caption.

Figure 14:
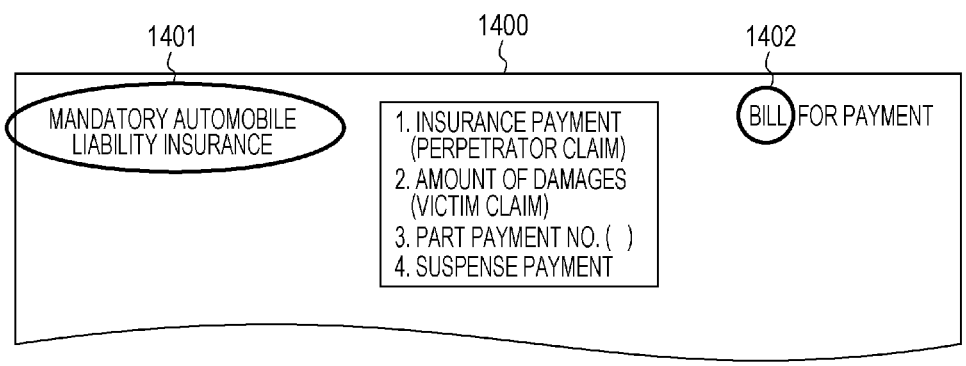
FIG. 14 illustrates an example of sample image data.

Next, in S1205, the CPU 111 checks whether or not the same character string as the folder name associated with the sample image data exists in the result of the character recognition processing obtained in S1204. It should be noted that, at this time, as illustrated in FIG. 14, the CPU 111 determines that the same character string as the folder name exists also in a case where the same character string as the folder name is displayed while being divided in a plurality of areas. For example, in the example of FIG. 14, with respect to a folder name "mandatory automobile liability insurance bill", a character string 1401 "mandatory automobile liability insurance" and a character string 1402 "bill" are separately written in sample image data 1400. In this case too, the CPU 111 determines that the same character string as the folder name exists.

In a case where the same character string exists (S1205: Yes), the CPU 111 advances the processing to S1206. In a case where the same character string does not exist (S1205: No), the CPU 111 advances the processing to S1209. It should be noted that, according to the present exemplary embodiment, the same character string as the folder name is set as the detection target, but the character string of the detection target may be a character string similar to the folder name.

In S1206, the CPU 111 determines whether or not the same character string as the folder name is divided into a plurality of areas. When it is determined that the character string is divided into the plurality of areas (S1206: Yes), the CPU 111 advances the processing to S1207. When it is determined that the character string is not divided into the plurality of areas (S1206: No), the CPU 111 advances the processing to S1208.

In S1207, the CPU 111 registers each of the plurality of areas as the enlargement area. For example, in a case where the two character strings 1401 and 1402 are detected as in the example of FIG. 14, each of the areas of the character strings 1401 and 1402 is identified as the enlargement area. Then, the CPU 111 associates the type of the document, the folder name, the sample image data, and the plural pieces of enlargement area information indicating the enlargement area with one another to be registered in the DB 310.

In S1208, the CPU 111 identifies the area where the same character string as the folder name is detected as the enlargement area. Then, the CPU 111 associates the type of the document, the folder name, the sample image data, and the enlargement area information indicating the enlargement area with one another to be registered in the DB 310. The processing in S1208 is similar to the processing in S206 of FIG. 2. It should be noted that the enlargement area information registered in step S1207 includes information indicating each of the plurality of enlargement areas, and in contrast, the enlargement area information registered in step S1208 includes information indicating the single enlargement area.

On the other hand, when it is determined that the same character string does not exist in S1205, the CPU 111 does not automatically identify the enlargement area from the result of the character recognition. In view of the above, in S1209, the CPU 111 displays the enlargement area specification screen (FIG. 5) for the user to specify the enlargement area. The processing in S1209 is similar to the processing in S207 of FIG. 2.

It should be noted however that, in a case where the same character string as the folder name is divided into a plurality of areas and the plurality of areas exist, the user specifies the plurality of areas on the enlargement area specification screen as the enlargement area. Then, in S1210, the CPU 111 registers one or plurality of areas specified by the user as the enlargement area information indicating the enlargement area in the DB 310 while being associated with the type of the document, the folder name, and the sample image data.

Figure 15:
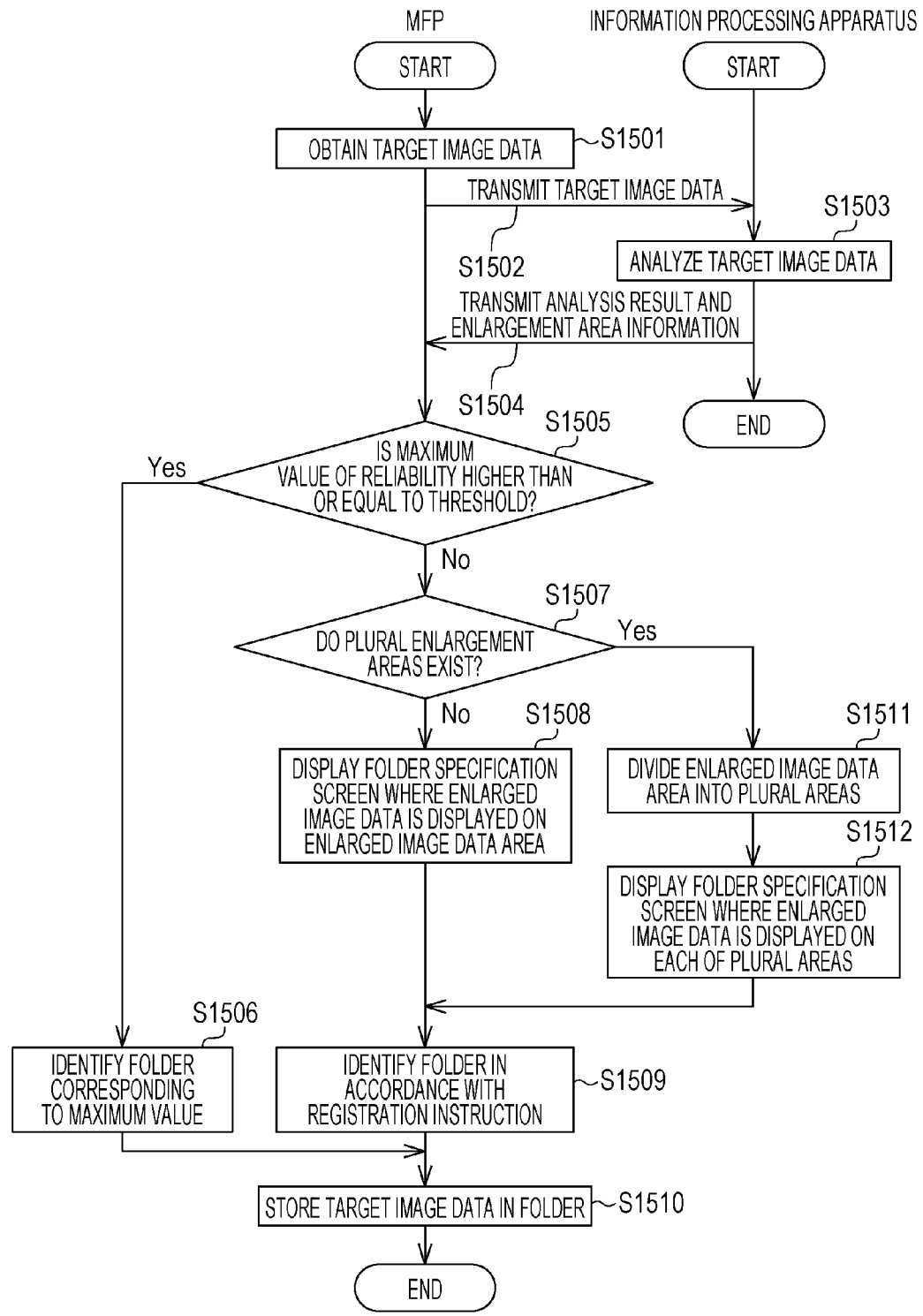
FIG. 15 is a sequence diagram illustrating the target image data distribution processing.

FIG. 15 is a sequence diagram illustrating the target image data distribution processing by the document distribution system. In S1501, the CPU 101 of the MFP 100 obtains the target image data scanned by the scanner 109. Next, in S1502, the CPU 101 transmits the target image data to the information processing apparatus 110.

When the CPU 111 of the information processing apparatus 110 receives the target image data in S1502, an analysis of the target image data is performed in S1503. Specifically, the CPU 111 compares the respective sample image data registered in the DB 310 for the respective types of the documents with the target image data received in S1502. Then, the CPU 111 calculates reliabilities with respect to the respective sample image data (calculation processing) on the basis of the comparison result. The CPU 111 uses, for example, similarities between the target image data and the respective sample image data as the reliabilities. Then, the CPU 111 sequentially identifies a predetermined number of pieces of sample image data in a descending order from the higher reliabilities (similarities). Furthermore, the CPU 111 identifies the type of the document associated with the identified sample image data and identifies the enlargement area information associated with the identified type of the document. Next, in S1504, the CPU 111 transmits the analysis result and the enlargement area information corresponding to the types of the respective documents to the MFP 100. Herein, the analysis result includes the reliabilities for the respective types of the documents obtained in S1503.

When the MFP 100 receives the analysis result and the enlargement area information in S1504, the maximum value of the reliability as the received analysis result is compared with the predetermined threshold in S1505. Herein, the threshold is previously set in the HDD 104 or the like. In a case where the maximum value of the reliability is higher than or equal to the threshold (S1505: Yes), the CPU 101 advances the processing to S1506. It should be noted that the case where the maximum value is higher than or equal to the threshold is a case where the type of the document corresponding to the sample image data indicating the maximum value can be identified as the type of the document corresponding to the target image data. In view of the above, in this case, the CPU 101 identifies the folder associated with the type of the document corresponding to the sample image data indicating the maximum value as the distribution destination folder of the target image data in S1506 and advances the processing to S1510.

On the other hand, in S1505, the case where the maximum value is lower than the threshold is a case where the CPU 101 does not automatically identify the type of the document corresponding to the target image data. In view of the above, in this case, processing of displaying folders of the distribution destination candidates for asking the user to specify the distribution destination folder is performed. At this time, similarly as in FIG. 9 illustrated in the first exemplary embodiment, the folder specification screen includes the area 902 for displaying the folder name buttons corresponding to the distribution destination candidates and the area 903 for displaying the reliabilities of the respective candidates. Herein, when the user selects one of the folder name buttons displayed on the area 902, in S1507, the CPU 101 checks whether or not a plurality of enlargement areas registered with respect to the document type corresponding to the selected folder name button exist. In a case where the enlargement area information with regard to the selected folder name button (type of the document) includes the information indicating the plurality of enlargement areas, the CPU 101 determines that the plurality of enlargement areas are registered. When it is determined that the plurality of enlargement areas are registered (S1507: Yes), the CPU 101 advances the processing to S1511. In a case where only the single enlargement area exists (S1507: No), the CPU 101 advances the processing to S1508.

In S1508, the CPU 101 enlarges and displays the target image data on the basis of the single enlargement area associated with the selected folder name button. For example, when the user selects the folder name button 911 "estimate" as illustrated in FIG. 9, the CPU 101 displays part of the target image data 901 as the enlarged image data 910 on the basis of the enlargement area information registered while being associated with this "estimate".

It should be noted that, in a case where the user selects the incorrect folder name button, the enlarged image data corresponding to this folder name button is displayed. However, in this case, the area that is not intended by the user is enlarged and displayed. For this reason, when the enlarged image data is viewed, the user can understand that the selected folder name is incorrect and select another folder name button again.

The user checks the area of the enlarged image data 910 to confirm whether or not the distribution destination of the target image data is the folder corresponding to the currently selected folder name button. Then, the user confirms that the distribution destination folder is the folder corresponding to the currently selected folder button and presses the OK button 904. When the OK button 904 is pressed, in S1509, the CPU 101 identifies the folder corresponding to the currently selected folder button as the distribution destination folder and thereafter advances the processing to S1510.

In S1510, the CPU 101 stores the target image data in the folder identified in S1506 or S1509.

Figure 16:
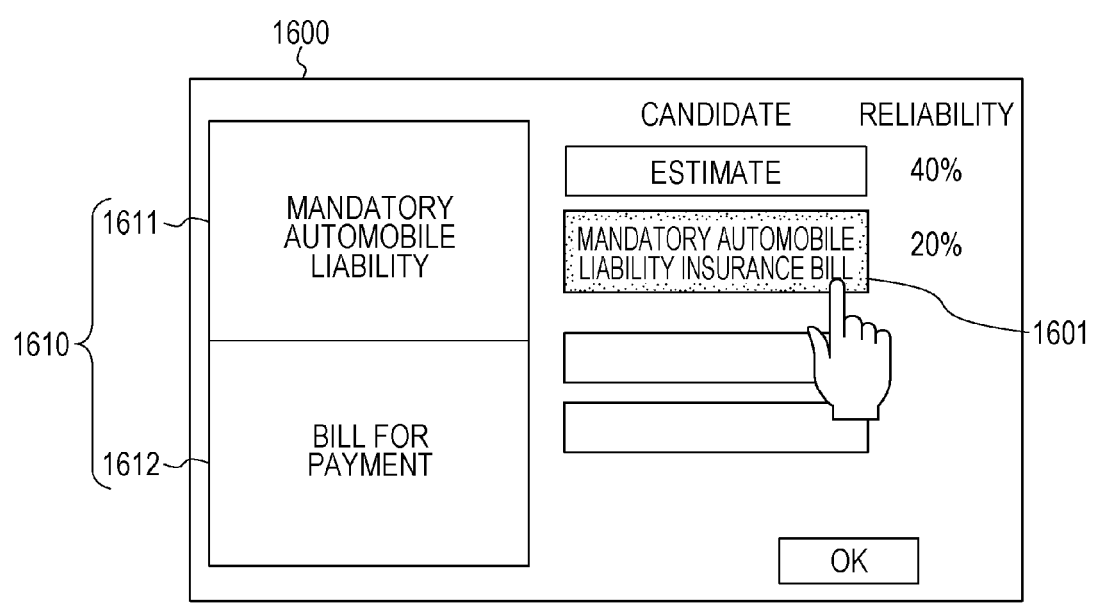
FIG. 16 illustrates an example of the folder specification screen.

On the other hand, in S1507, when it is determined that the plurality of enlargement areas are registered with respect to the folder name button, the CPU 101 divides an enlarged image data area 1610 on a folder specification screen 1600 into areas 1611 and 1612 on the basis of the number of the enlargement areas indicated by the enlargement area information (division processing) in S1511 as illustrated in FIG. 16. Next, in S1512, the CPU 101 displays the folder specification screen 1600. As illustrated in FIG. 16, when the user selects a folder name button 1601 "mandatory automobile liability insurance bill", since two enlargement areas are associated with this folder name button, the enlarged image data area 1610 is displayed while being divided into the two areas 1611 and 1612. Pieces of the target image data at positions corresponding to the respective enlargement areas are lined up to be enlarged and displayed on the respective areas 1611 and 1612 of the enlarged image data area 1610. It should be noted that, in a case where the number of the enlargement areas is three or more, the CPU 101 may divide the enlarged image data area 1610 into three or more areas and enlarge and display pieces of the target image data of the respective enlargement areas. Herein, the processing in S1512 is an example of the display control processing of performing the control so as to enlarge and display each of the plurality of enlargement areas in the target image data at the same time.

According to the third exemplary embodiment, in a case where the plurality of enlargement areas are registered, the plurality of enlargement areas are all displayed, so that the user can check the type of the document with little work. For example, as in the example illustrated in FIG. 14, in a case where the same character string as the folder name is divided into the plurality of areas to be displayed, the document distribution system according to the present exemplary embodiment can display all of the plurality of character strings on the folder specification screen 1000 at the time same, so that the user can easily identify the type of the document.

Fourth Exemplary Embodiment

Figure 17:
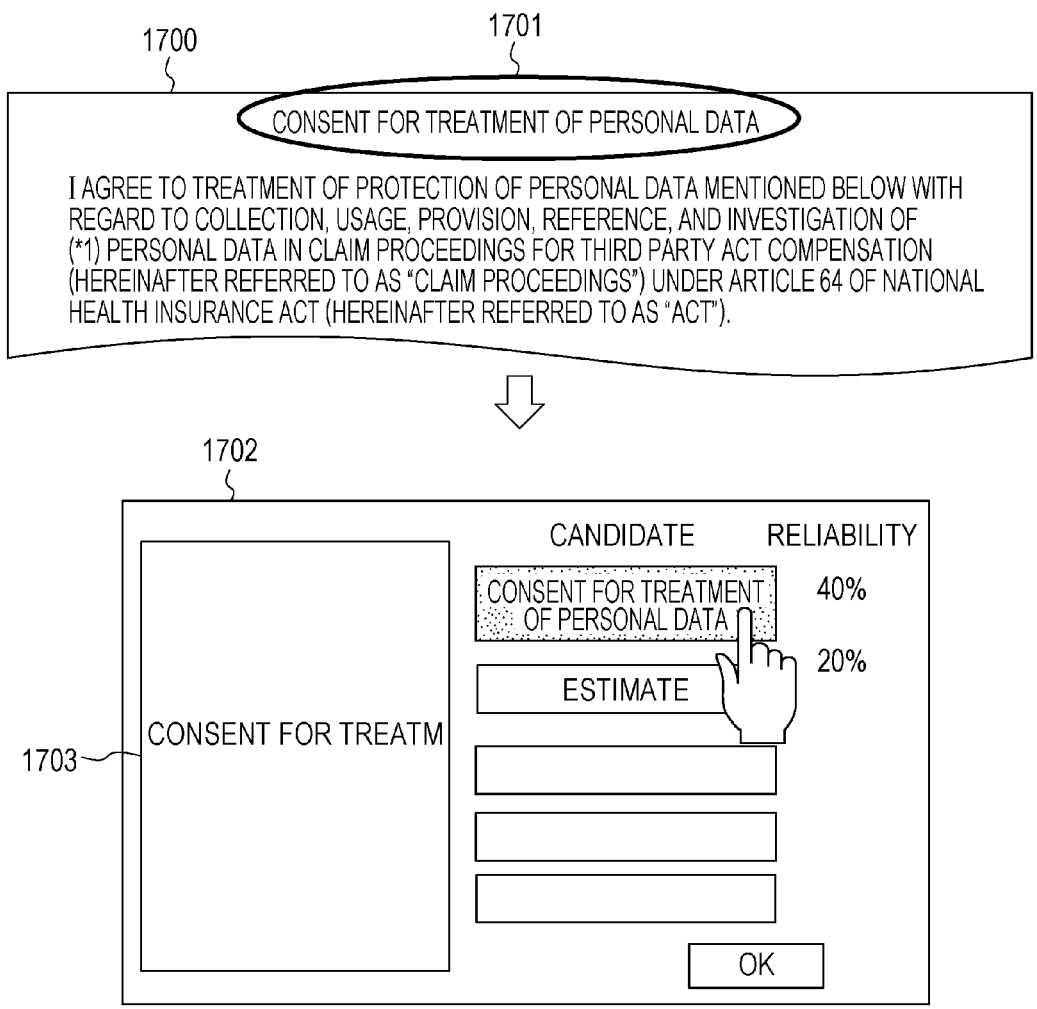
FIG. 17 is an explanatory diagram for describing a fourth exemplary embodiment.

As illustrated in FIG. 17, in a case where a character string 1701 indicating the type of the document associated with the folder name is too long in a document 1700, the entire character string is not displayed on an enlarged image data area 1703 on a folder specification screen 1702. It is also conceivable to reduce and display the character string, but if the character size is too small, it is difficult for the user to check the displayed content. In the above-described case, the document distribution system according to a fourth exemplary embodiment extracts a word from the character string indicating the type of the document and displays this on the enlarged image data area. Hereinafter, a difference with regard to the document distribution system according to the fourth exemplary embodiment from the document distribution system according to the first exemplary embodiment will be described.

Figure 18:
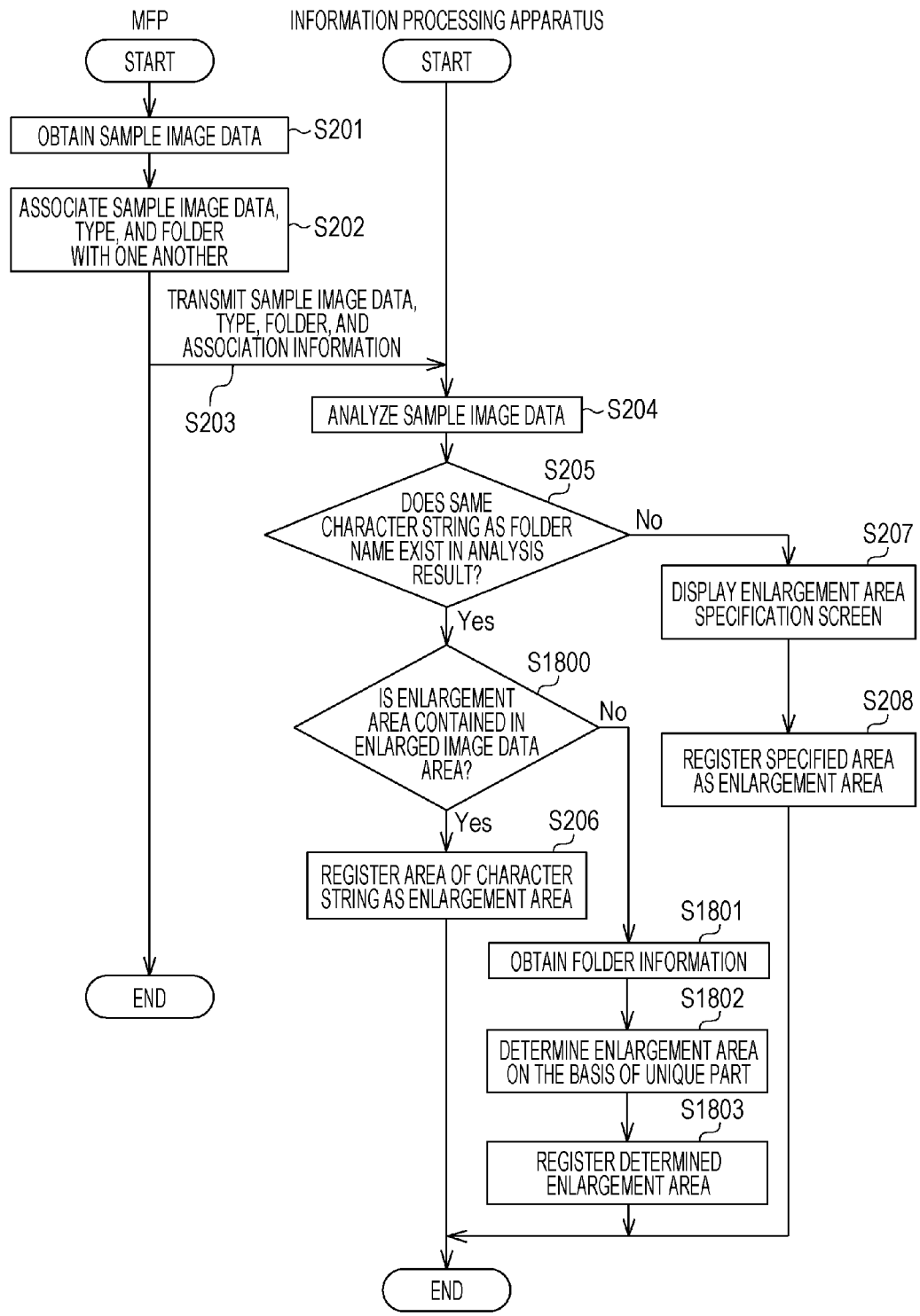
FIG. 18 is a sequence diagram illustrating the sample image data registration processing according to the fourth exemplary embodiment.

FIG. 18 is a sequence diagram illustrating the sample image data registration processing according to the fourth exemplary embodiment. It should be noted that the same processes as the respective processes in the sample image data registration processing according to the first exemplary embodiment described with reference to FIG. 2 among the respective processes illustrated in FIG. 18 are assigned with the same reference numerals. In S205, the CPU 111 checks whether or not the same character string as the folder name associated with the sample image data exists in the result of the character recognition processing obtained in S204. Then, in a case where the same character string exists (S205: Yes), the CPU 111 advances the processing to S1800. In a case where the same character string does not exist (S205: No), the CPU 111 advances the processing to S207.

In S1800, the CPU 111 checks whether or not the same character string as the folder name is contained in the enlarged image data area 1703 on the folder specification screen 1702 while the character string has a predetermined character size or larger. Specifically, a smallest character size that can be displayed on the enlarged image data area 1703 is previously set in the HDD 114, for example. Herein, the smallest character size is an example of a threshold of the character size. Then, the CPU 111 identifies the character size of the same character string as the folder name in a case where the same character string as the folder name is contained in the enlarged image data area 1703 on the displayed screen, that is, the character size after the reduction. Then, in a case where the character size after the reduction is larger than or equal to the smallest character size, the CPU 111 determines that the character string is contained in the enlarged image data area 1703. On the other hand, in a case where the character size after the reduction is smaller than the smallest character size, the CPU 111 determines that the character string is not contained in the enlarged image data area 1703.

In a case where the CPU 111 determines that the same character string as the folder name is contained in the enlarged image data area 1703 (S1800: Yes), the CPU 111 advances the processing to S207. In a case where the CPU 111 determines that the same character string as the folder name is not contained in the enlarged image data area 1703 (S1800: No), the CPU 111 advances the processing to S1801.

Figure 19A:
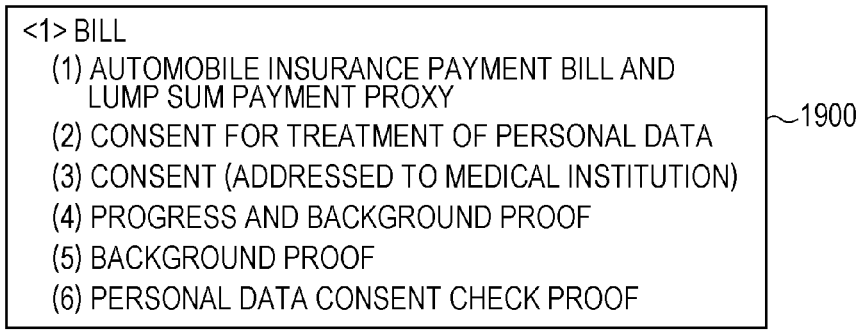
FIGS. 19A and 19B are explanatory diagrams for describing folder information.
Figure 19B:
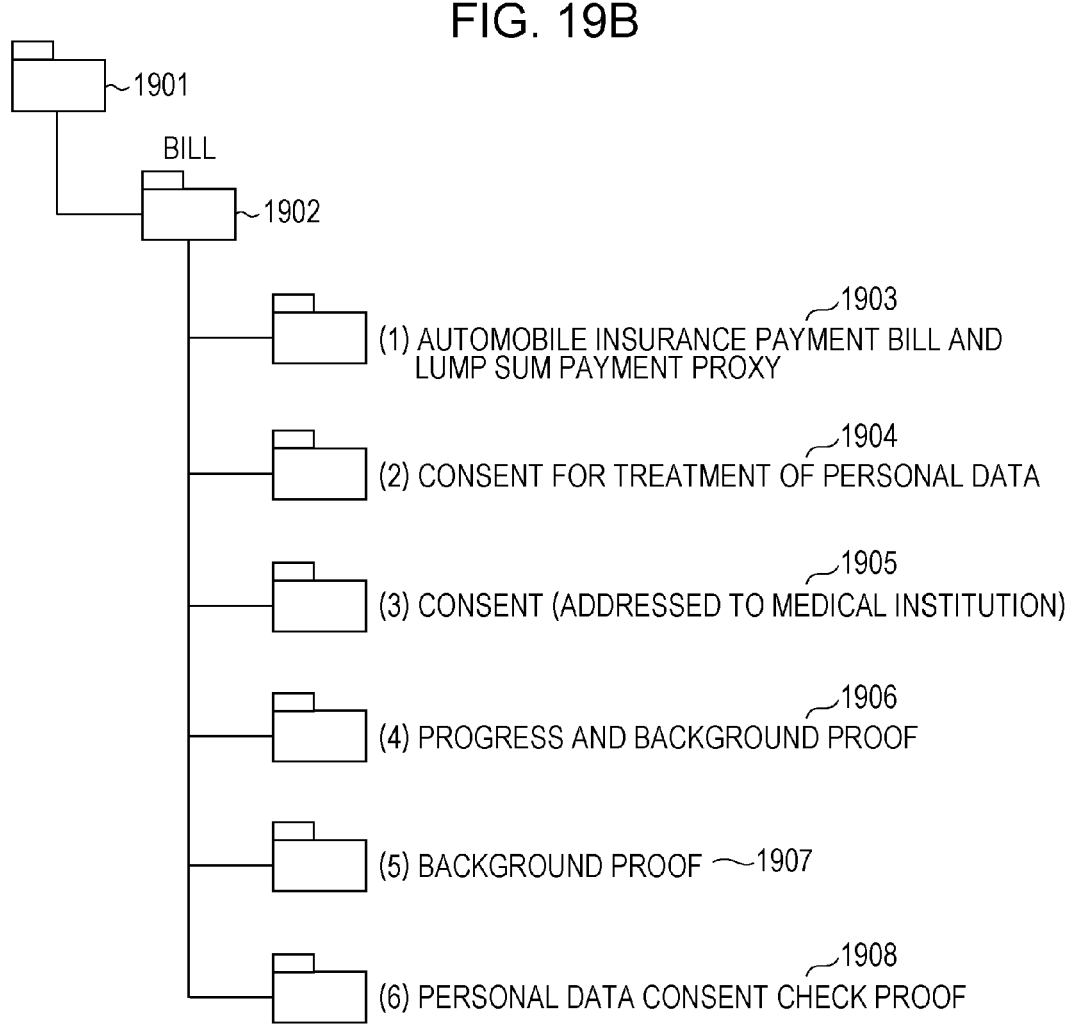

In S1801, the CPU 111 receives folder information from the MFP 100. FIGS. 19A and 19B are explanatory diagrams for describing the folder information. According to the present exemplary embodiment, a folder is hierarchized. FIG. 19B is an explanatory diagram for describing folder information 1900 illustrated in FIG. 19A. A bill folder 1902 belonging to a highest-order folder 1901 is equivalent to "<1> bill" indicated by the folder information 1900. Then, folders 1903 to 1908 respectively corresponding to (1) to (6) of the folder information 1900 are set under the bill folder 1902. The CPU 111 sets, for example, that the target folder name is "consent for the treatment of personal data". In this case, the CPU 111 obtains information indicating the folder names of all the folders 1903 to 1908 belonging to the same higher-order folder 1902, to which the folder 1904 belongs, from the MFP 100 as the folder information. It should be noted that it is sufficient if a timing for obtaining the folder information is before the processing in the subsequent step S1802, and the timing may also be before the processing in S1800.

Next, in S1802, the CPU 111 identifies a word unique to the folder name of the target folder on the basis of the folder name indicated by the folder information 1900 (word identification processing) and determines an area of this word as the enlargement area. Herein, an example of the folder name "consent for the treatment of personal data" will be described with reference to FIGS. 19A and 19B. First, the CPU 111 uses a dictionary or the like to extract nouns from the character string "consent for the treatment of personal data". Accordingly, "personal data" and "consent" are extracted. Next, the CPU 111 checks whether or not the respective nouns "personal data" and "consent" are included in the folder names of the other folders 1903 and 1905 to 1908 belonging to the folder 1902. Since the noun "personal data" is also included in a character string of the folder name "(6) personal data consent check proof" of the folder 1908, the CPU 111 determines that the noun "personal data" is not unique. Similarly, the noun "consent" is also included in a character string of the folder name "(3) consent (addressed to medical institution)" of the folder 1905, the CPU 111 determines that the noun "consent" is not unique.

When it is determined that all the nouns extracted from the folder name of the target folder are not unique, next, the CPU 111 checks whether or not the folder name including both the noun "personal data" and the noun "consent" is included in the folder names of the other folders. The folder name including both the noun "personal data" and the noun "consent" does not exist in the other folders 1903 and 1905 to 1908. In this manner, in a case where the other folder names including the respective plural nouns do not exist, it is possible to identify the type of the document since the folder name includes both "personal data" and "consent". In view of the above, in this case, the CPU 111 determines the respective areas for the two nouns "personal data" and "consent" as the enlargement areas.

Next, in S1803, the CPU 111 registers each of the plurality of enlargement areas determined in S1802 in the DB 310 while being associated with the type of the document, the folder name, and the sample image data.

Figure 20:
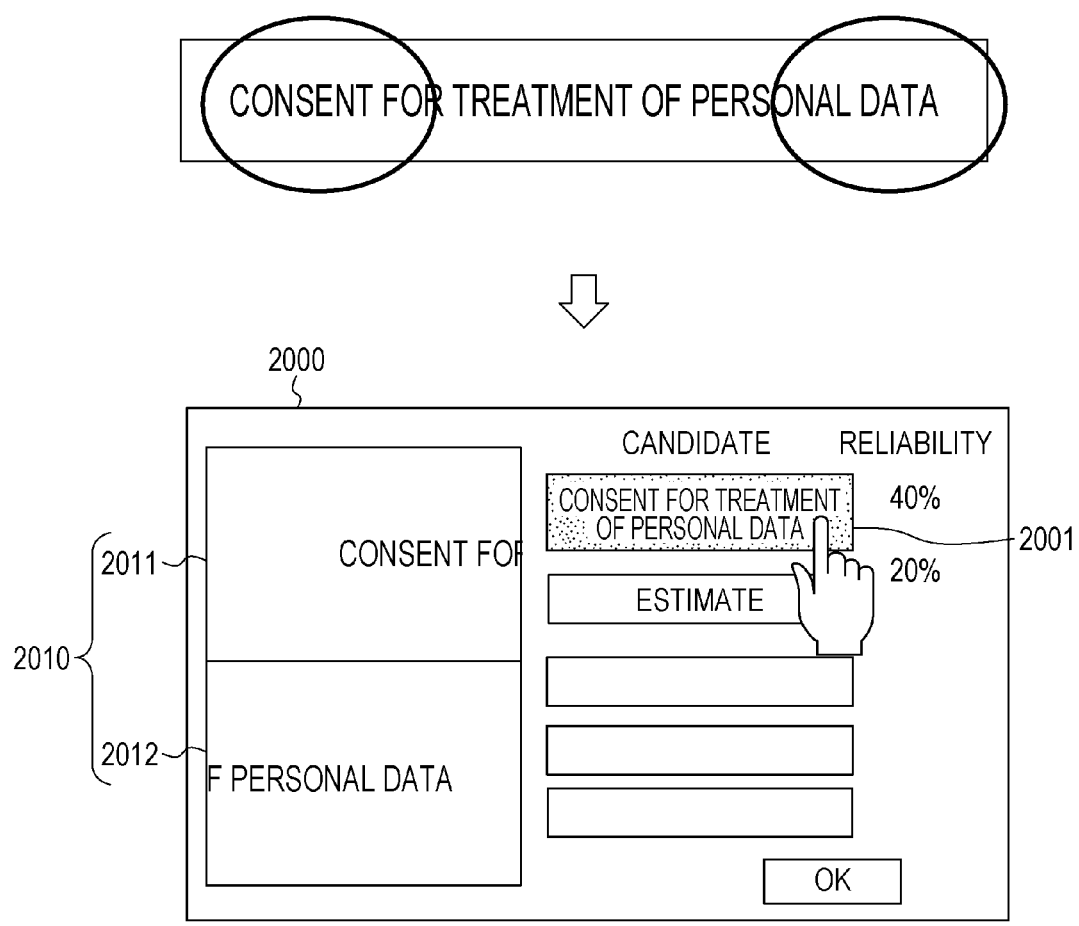
FIG. 20 illustrates an example of the folder specification screen.

On the other hand, the target image data distribution processing is similar to the target image data distribution processing described in the third exemplary embodiment. In a case where a plurality of enlargement areas exist, the CPU 101 divides the display area of the enlarged image data into a plurality of areas in S1511 and enlarges and display the character strings partially matched with the folder name in the respective divided areas in S1512. FIG. 20 illustrates an example of a folder specification screen 2000. In the example of FIG. 20, as described above, the character strings of the two nouns "personal data" and "consent" extracted with respect to the type of the document "consent for the treatment of personal data" are respectively displayed on areas 2011 and 2012.

As described above, in the document distribution system according to the fourth exemplary embodiment, in a case where the plurality of words characteristic to the folder name exist, each of the plurality of words are respectively enlarged and displayed, so that the user can easily check the type of the document. For example, as in the example of FIG. 17, the same character string as the file name is displayed from the beginning on the enlarged image data area 1703. In this case, the user does not identify the type of the document from only the displayed character string, and it is necessary to display the subsequent character string by its own operation and perform the checking of the character string, which is troublesome. In contrast to this, the document distribution system according to the present exemplary embodiment can extract the plurality of words in the character string and display the plurality of words at the same time as illustrated in FIG. 20, so that the user can easily identify the type of the document.

Fifth Exemplary Embodiment

Figure 21:
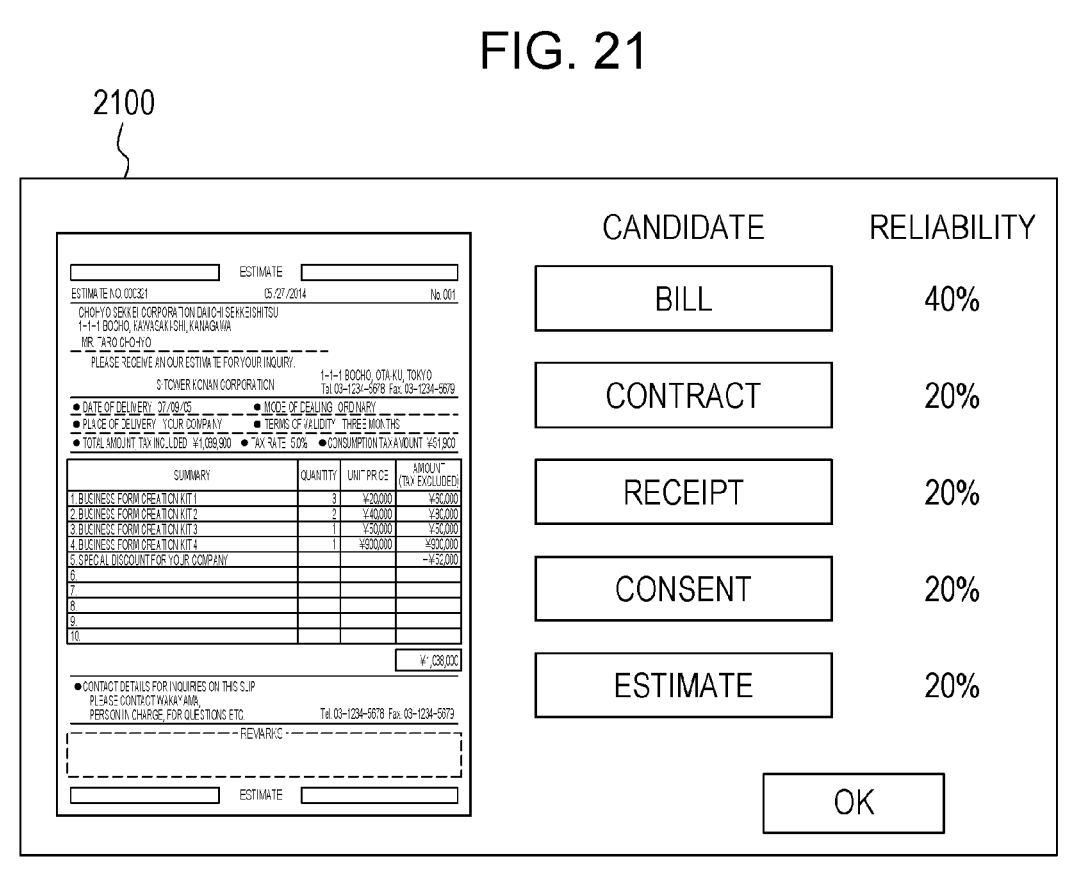

Next, the document distribution system according to a fifth exemplary embodiment will be described. FIG. 21 illustrates an example of a folder specification screen 2100. Five file name buttons are displayed on the folder specification screen 2100 as the candidates of the type of the document. In this manner, in a case where the five file name buttons are displayed, the user needs to perform an operation of selecting the folder name button and checking the enlargement area up to five times until a correct file name is identified, and it takes much work. According to the fifth exemplary embodiment, the CPU 101 adjusts values of reliabilities of the association between the target image data and the file names in accordance with the assigning situation of the target image data to the folders and displays the file name buttons in the order of reliabilities.

According to the present exemplary embodiment, it is assumed that at least one or more pieces of image data are classified to each of the plurality of folders. For example, in the example of FIGS. 19A and 19B, the six folders 1903 to 1908 are prepared for the folder 1902 for the bill. In this example, in a case where six or more pieces of the image data are distributed, at least one or more pieces of image data are distributed to each of the folders. In contrast to this, in a case where the folder to which the image data is not distributed remains after the distribution of the image data, when the image data is displayed on the folder specification screen 2100, the MFP 100 increases the priority rank for the image data to be associated with the folder.

FIGS. 22A and 22B are sequence diagrams illustrating the target image data distribution processing. Since processing in S2201 to S2205 is similar to the processing in S1501 to S1505 of FIG. 15, descriptions thereof will be omitted. In a case where the maximum value of the reliability is higher than or equal to the threshold (S2205: Yes), the CPU 101 advances the processing to S2206. In a case where the maximum value of the reliability is lower than the threshold (S2205: No), the CPU 101 advances the processing to S2207. In S2206, the CPU 101 identifies the folder associated with the type of the document corresponding to the sample image data indicating the maximum value as the distribution destination folder of the target image data. Then, the CPU 101 stores the target image data in this folder and advances the processing to S2208. On the other hand, in S2207, it is determined that the type of the document of the target image data is not identified, and the CPU 101 stores the target image data in an unclear folder and advances the processing to S2208. Herein, the unclear folder refers to a folder that stores the image data where the distribution destination is not identified on the basis of the reliability.

In S2208, the CPU 101 determines whether or not the distribution based on the reliabilities of all of the target image data is ended. In a case where the distribution based on the reliabilities of all of the target image data is ended (S2208: Yes), the CPU 101 advances the processing to S2209. In a case where the unprocessed target image data remains (S2208: No), the CPU 101 returns the processing to S2201.

In S2209, the CPU 101 determines whether or not the unclear folder stores the image data. In a case where the unclear folder stores the image data (S2209: Yes), the CPU 101 advances the processing to S2210. In a case where the unclear folder does not store the image data (S2209: No), the CPU 101 ends the target image data distribution processing. In S2210, the CPU 101 determines whether or not the folder to which the image data is not distributed exists. In a case where the folder to which the image data is not distributed exists (S2210: Yes), the CPU 101 advances the processing to S2211. In a case where the folder to which the image data is not distributed does not exist (S2210: No), the CPU 101 advances the processing to S2212.

In S2211, the CPU 101 increases the priority rank of the type of the document associated with the folder to which the image data is not distributed.

In S2212, the CPU 101 selects one of image data in the unclear folder as the processing target and advances the processing to S2213. The respective processings in S2213 to S2217 are similar to S1507 to S1509, S1511, and S1512 of FIG. 15. In S2217, when the storage of the image data selected in S2212 into the folder is ended, thereafter, the CPU 101 advances the processing to S2218. In S2218, the CPU 101 determines whether or not distribution of all the image data stored in the unclear folder to folders other than the unclear folder is ended. In a case where the distribution of all the image data is ended (S2218: Yes), the CPU 101 ends the target image data distribution processing. In a case where the image data where the distribution is not completed exists (S2218: No), the CPU 101 returns the processing to S2212.

As described above, according to the above-described respective exemplary embodiments, it is possible to enlarge and display the appropriate area while the burden of the user at the time of the image data registration is alleviated.

The exemplary embodiments of the present invention have been described above in detail, but the present invention is not limited to the above-described particular exemplary embodiments, and various modifications and alterations can be made within the gist of the present invention described in the scope of claims.

Other Exemplary Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-198684, filed Oct. 6, 2015, and Japanese Patent Application No. 2015-198685, filed Oct. 6, 2015, which are hereby incorporated by reference herein in their entirety.

What is claimed is:

1. A document distribution system, comprising:
a processor; and
a memory that stores a computer program,
wherein the processor executes the computer program to perform:
   obtaining a sample image and a folder name of a saving destination folder selected by a user;
   executing character recognition processing on the sample image to obtain character strings;
   determining whether a same character string as the folder name of the saving destination folder exists among the character strings obtained by the character recognition processing;
   registering, as an enlargement area, an area corresponding to the same character string in the sample image in a case where it is determined that the same character string as the folder name of the saving destination folder exists, wherein the registered enlargement area is associated with the sample image and the folder name;
   obtaining a target image on which distribution processing is to be performed;
   identifying the sample image similar to the obtained target image; and
   displaying an area of the target image corresponding to the registered enlargement area associated with the identified sample image.

2. The document distribution system according to claim 1, wherein an area of the target image corresponding to the displayed enlargement area is enlarged and displayed on a folder specification screen for specifying, based on a user's designation, a folder in which the target image is stored.

3. The document distribution system according to claim 2, wherein a plurality of sample images similar to the received target image are identified, and
wherein enlargement areas respectively associated with the plurality of identified sample images are displayed, and
wherein an area of the target image is enlarged and displayed on a basis of an enlargement area corresponding to a folder name of a currently selected folder on the folder specification screen.

4. The document distribution system according to claim 2, wherein the folder specification screen is displayed in a case where a similarity of a sample image similar to the received target image is lower than a predetermined threshold.

5. The document distribution system according to claim 1, wherein, in a case where it is determined that the same character string as the folder name of the saving destination folder exists, the processor asks the user to specify an enlargement area in the sample image and registers the specified enlargement area, the sample image, and the folder name while being associated with one another.

6. The document distribution system according to claim 1, wherein, in a case where a plurality of the same character strings as the folder name of the saving destination folder exist among the obtained character strings, a character string that satisfies a predetermined condition is identified among the plurality of the same character strings, and an area corresponding to the identified character string is registered as the enlargement area.

7. The document distribution system according to claim 1, wherein, in a case where the same character string as the folder name of the saving destination folder is separately written in a plurality of areas of the sample image, the plurality of areas are registered as the enlargement areas.

8. The document distribution system according to claim 7, wherein
areas of the target image corresponding to the registered plurality of enlargement areas are lined up to be enlarged and displayed on a folder specification screen for specifying, based on a user's designation, a folder in which the target image is stored.

9. The document distribution system according to claim 1, wherein, in a case where it is determined that the same character string as the folder name of the saving destination folder exists, the enlargement area is registered on a basis of a unique part of the folder name, wherein the registered enlargement area is associated with the sample image and the folder name.

10. The document distribution system according to claim 9, wherein, in a case where it is determined that the same character string as the folder name of the saving destination folder exists, the processor further determines whether or not the same character string as the folder name can be displayed at a predetermined character size or larger on a folder specification screen for specifying a folder in which the target image is stored, wherein the enlargement area is registered on a basis of the unique part of the folder name if it is determined that the display is not to be performed, wherein the registered enlargement area is associated with the sample image and the folder name.

11. An information processing method, comprising:
receiving a sample image and a folder name of a saving destination folder selected by a user;
executing character recognition processing on the sample image to obtain character strings;
determining whether a same character string as the folder name of the saving destination folder exists among the obtained character strings;
registering, as an enlargement area, an area corresponding to the same character string in the sample image in a case where it is determined that the same character string as the folder name of the saving destination folder exists, wherein the registered enlargement area is associated with the sample image and the folder name;
obtaining a target image on which distribution processing is to be performed; and
identifying the sample image similar to the obtained target image; and
displaying an area of the target image corresponding to the registered enlargement area associated with the identified sample image.

12. The information processing method according to claim 11,
wherein an area of the target image corresponding to the displayed enlargement area is enlarged and displayed on a folder specification screen for specifying, based on a user's designation, a folder in which the target image is stored.

13. The information processing method according to claim 12,
wherein a plurality of sample images similar to the received target image are identified, and
wherein enlargement areas respectively associated with the plurality of identified sample images are displayed, and
wherein an area of the target image is enlarged and displayed on a basis of an enlargement area corresponding to a folder name of a currently selected folder on the folder specification screen.

14. A non-transitory computer-readable storage medium storing a computer program that causes a computer to perform:
obtaining a sample image and a folder name of a saving destination folder selected by a user;
executing character recognition processing on the sample image to obtain character strings;
determining whether a same character string as the folder name of the saving destination folder exists among the obtained character strings;
registering, as an enlargement area, an area corresponding to the same character string in the sample image in a case where it is determined that the same character string as the folder name of the saving destination folder exists, wherein the registered enlargement area is associated with the sample image and the folder name;
obtaining a target image on which distribution processing is to be performed; and
identifying the sample image similar to the obtained target image; and
displaying an area of the target image corresponding to the registered enlargement area associated with the identified sample image.

15. The non-transitory computer-readable storage medium according to claim 14, wherein an area of the target image corresponding to the displayed enlargement area is enlarged and displayed on a folder specification screen for specifying, based on a user's designation, a folder in which the target image is stored.

16. The non-transitory computer-readable storage medium according to claim 15,
wherein a plurality of sample images similar to the received target image are identified, and
wherein enlargement areas respectively associated with the plurality of identified sample images are displayed, and
wherein an area of the target image is enlarged and displayed on a basis of an enlargement area corresponding to a folder name of a currently selected folder on the folder specification screen.

* * * * *